United States Patent
Black et al.

(10) Patent No.: US 11,494,440 B1
(45) Date of Patent: *Nov. 8, 2022

(54) PROACTIVE AND REACTIVE SUGGESTIONS FOR A MESSAGING SYSTEM

(71) Applicant: META PLATFORMS, INC., Menlo Park, CA (US)

(72) Inventors: Heath William Black, Fremont, CA (US); Willy Blandin, Menlo Park, CA (US); Laurent Nicolas Landowski, Menlo Park, CA (US); Henri Romeo Liriani, Oakland, CA (US); Kemal El Moujahid, Belmont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,597

(22) Filed: Jun. 4, 2020

Related U.S. Application Data

(63) Continuation-in-part of application No. 15/485,665, filed on Apr. 12, 2017, now Pat. No. 11,025,566.

(51) Int. Cl.
*G06F 40/56* (2020.01)
*G06F 16/9032* (2019.01)
*H04L 51/02* (2022.01)

(52) U.S. Cl.
CPC ........ *G06F 16/90332* (2019.01); *G06F 40/56* (2020.01); *H04L 51/02* (2013.01)

(58) Field of Classification Search
None
See application file for complete search history.

(56) References Cited

U.S. PATENT DOCUMENTS

| 7,774,292 B2 | 8/2010 | Brennan et al. |
| 9,647,968 B2 | 5/2017 | Smullen et al. |

(Continued)

FOREIGN PATENT DOCUMENTS

| JP | H055372 A | 1/1993 |
| JP | 2014142919 A | 8/2014 |

(Continued)

OTHER PUBLICATIONS

International Search Report and Written Opinion received for PCT Patent Application No. PCT/US2017/027921, dated Jan. 11, 2018, 14 pages.

(Continued)

*Primary Examiner* — Thu N Nguyen
(74) *Attorney, Agent, or Firm* — Fenwick & West LLP

(57) ABSTRACT

Exemplary embodiments relate to techniques for suggesting bots or mini-apps in a messaging service that provide capabilities related to an ongoing conversation. A suggestion may be added proactively or reactively. In a reactive scenario, the system may respond to an express request to suggest a response or capability, such as by an explicit command. In the proactive scenario, the messaging service may analyze the messages of the conversation, and may suggest a response or capability based on an intent identified in the messages. Examples of suggestions include starting a poll, adding stickers to the conversation, group coordination and planning capabilities, etc. Suggestions such as these allow a user to make use of various capabilities provided by the messaging service, even if the user does not know that the service exists, or how to invoke it.

17 Claims, 31 Drawing Sheets

(56) References Cited

U.S. PATENT DOCUMENTS

| | | |
|---|---|---|
| 9,699,128 B1 | 7/2017 | Zhang |
| 10,162,817 B2 | 12/2018 | Schlesinger et al. |
| 10,740,373 B2 | 8/2020 | Altaf et al. |
| 2011/0208714 A1 | 8/2011 | Soukal et al. |
| 2012/0117167 A1 | 5/2012 | Sadja et al. |
| 2013/0006904 A1 | 1/2013 | Horvitz et al. |
| 2013/0159115 A1 | 6/2013 | Adams |
| 2014/0068467 A1 | 3/2014 | Van et al. |
| 2014/0164953 A1 | 6/2014 | Lynch et al. |
| 2015/0067503 A1 | 3/2015 | Slayton et al. |
| 2015/0186156 A1 | 7/2015 | Brown et al. |
| 2015/0356468 A1 | 12/2015 | Cummins |
| 2016/0301639 A1 | 10/2016 | Liu et al. |
| 2016/0335532 A1 | 11/2016 | Sanghavi et al. |
| 2017/0180276 A1 | 6/2017 | Gershony et al. |
| 2017/0180294 A1* | 6/2017 | Milligan ............... H04L 51/02 |
| 2017/0250936 A1 | 8/2017 | Rosenberg et al. |
| 2017/0295114 A1* | 10/2017 | Goldberg ............. H04L 67/306 |
| 2018/0005218 A1 | 1/2018 | Schneider |
| 2018/0040020 A1 | 2/2018 | Kurian et al. |
| 2018/0077180 A1 | 3/2018 | Zhang et al. |
| 2018/0083898 A1 | 3/2018 | Pham |
| 2018/0102989 A1 | 4/2018 | Borsutsky et al. |
| 2018/0108066 A1 | 4/2018 | Kale et al. |
| 2018/0129754 A1 | 5/2018 | Jones et al. |
| 2018/0181558 A1 | 6/2018 | Emery et al. |
| 2018/0181855 A1 | 6/2018 | Johnson, Jr. et al. |
| 2018/0241701 A1* | 8/2018 | Miyajima ............. G06Q 50/01 |
| 2018/0276667 A1 | 9/2018 | Rajurkar et al. |
| 2018/0293983 A1 | 10/2018 | Choi et al. |

FOREIGN PATENT DOCUMENTS

| | | |
|---|---|---|
| JP | 2015528140 A | 9/2015 |
| KR | 20120037085 A | 4/2012 |
| KR | 20130073101 A | 7/2013 |
| KR | 101428969 B1 | 9/2014 |
| KR | 101594500 B1 | 2/2016 |
| KR | 101712180 B1 | 3/2017 |
| WO | 2015187584 A1 | 12/2015 |
| WO | 2016135746 A2 | 9/2016 |

OTHER PUBLICATIONS

Extended European Search Report for European Application No. 17195876.2, dated Apr. 24, 2018, 8 pages.

International Preliminary Report on Patentability for International Application No. PCT/US2017/027921, dated Oct. 24, 2019, 13 Pages.

Notification of Reasons for Rejection dated Dec. 21, 2021 Japanese Application No. 2019555768, filed Apr. 17, 2017, 6 Pages.

Office Action dated Feb. 7, 2022 for Korean Patent Application No. 10-2021-7037441, 8 pages.

Office Acton dated Aug. 2, 2022 for Japanese Application No. 2019555768, filed Apr. 17, 2017, 5 pages.

* cited by examiner

800

```
Receive a plurality of bot capability catalogs for a plurality of
bots at a bot-service system, wherein each of the plurality of
bot capability catalogs expresses bot capability in natural
language for an associated bot.
802
```

```
Receive a user service prompt from a user client device, the
user service prompt expressed in natural language.
804
```

```
Determine one or more selected bots of the plurality of bots
by matching the user service prompt against the plurality of
bot capability catalogs.
806
```

```
Identify the one or more selected bots to the user client device
in response to receiving the user service prompt from the user
client device.
808
```

Receive a plurality of bot capability catalogs for a plurality of bots at a bot-service system, wherein each of the plurality of bot capability catalogs expresses bot capability in natural language for an associated bot.
862

Receive a plurality of user service prompts from a plurality of user client devices, the plurality of user service prompts expressed in natural language.
864

Determine selected bots of the plurality of bots for each of the plurality of user prompts by matching the plurality of user service prompts against the plurality of bot capability catalogs using a bot capability table generated by a natural-language machine-learning component.
866

Provide the selected bots to the plurality of user client device in response to receiving the plurality of user service prompts.
868

Record a bot interaction history based on user interactions with the selected bots.
870

Update the natural-language machine-learning component based on the bot interaction history.
872

*FIG. 8D*

PROACTIVE AND REACTIVE SUGGESTIONS FOR A MESSAGING SYSTEM

RELATED APPLICATIONS

This application is a continuation-in-part of U.S. patent application Ser. No. 15/485,665, filed on Apr. 12, 2017 and entitled "Techniques for Intent-Based Search for Bots." The contents of the aforementioned application are incorporated herein by reference.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

BRIEF DESCRIPTION OF THE DRAWINGS

FIG. 8A illustrates an embodiment of a first logic flow for the system of FIG. 1.

FIG. 8D illustrates an embodiment of a first logic flow for the system of FIG. 1.

DETAILED DESCRIPTION

Figure 1:
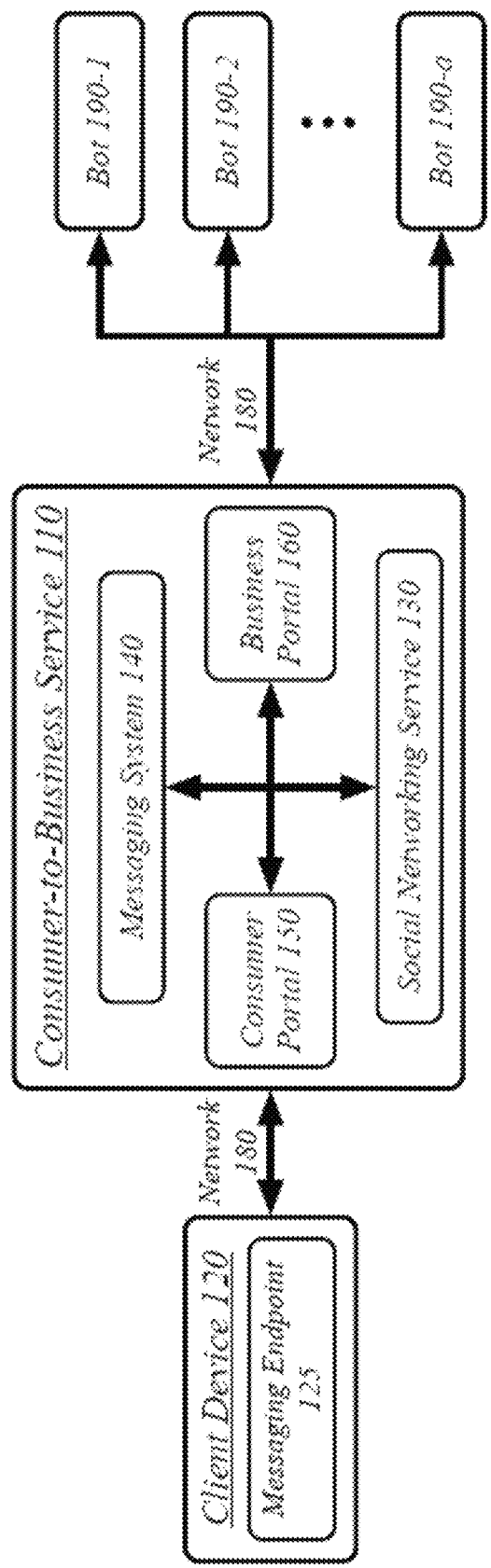
FIG. 1 illustrates an embodiment of a consumer-to-business messaging system.

Network-connected computing devices can provide their users with an unprecedented ability to engage in interpersonal communication. For instance, people may engage in messaging interactions with their friends, family, coworkers, and other associates. A user's message exchanges with a particular set of contacts may be maintained within distinct message threads.

These network-connected computing devices can also provide their users with access to network-accessible services. For instance, transportation services, dining services, entertainment services, and other services may use web sites, web applications, client applications, or other network-accessibility techniques to empower people to use their client devices to engage with their services. In some cases, such as some entertainment or media services, the service can be both arranged and delivered via the client devices. For example, music may be purchased via a client device and delivered to the client device for playback. In other cases, such as with transportation, dining, and in-person entertainment, the service can be arranged via the client devices, but is performed external to the client device. For example, a ride-sharing service may be arranged via a client device but performed through a vehicle and driver providing ride sharing to the user.

In some cases, the use of a network-accessible service may relate to more than one person. Particularly where a user's access to the service is a client device that they also use for messaging, a user may benefit from sharing their engagement with the network-accessible service in the messaging client with the others to whom the service relates. As such, message threads may act as hubs for a user's online social relationship with their contacts, with the message threads incorporating services requested, monitored, or engaged with via the same client used for messaging.

To aid a user in interacting with a service via a messaging context, services may be represented as messaging bots within a messaging system. A messaging bot may be an automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users.

As such, a user may engage with network services within the familiar experience of a messaging client. Further, by using a messaging client, a user may engage with network services within a messaging context so as to allow the inclusion of other people. In some cases, this may simply inform the other people as to the services, such as letting friends or family know about transportation details. In other cases, this may empower the performance of services for multiple people, such as where dinner, a ride, entertainment, or other service is arranged for the use of multiple people. As a result, the embodiments can improve the experience of using network-accessible services and can extend the reach of network-accessible services to the user of a messaging system.

A developer may be aided by being provided a natural way to specify the capabilities of their messaging bot. The bot platform may provide a bot engine that empower developers to define the capabilities of their bots using a set of developer-defined examples. Examples may be example statements or conversations that the developer believes should cause their messaging bot to be recommended. As a result, the embodiments can reduce the difficult of determining messaging bots for recommendation to a user.

A messaging service may suggest bots for users to engage with. These suggestions may be made within the context of a message thread between two or more users. As such, these suggestions may be made using techniques that control the amount of screen space used to display the suggestions. These suggestions may be controls that, when selected, instantiate a larger interface for the configuration of a service request with a messaging bot.

Exemplary embodiments described herein provide techniques for triggering suggestions for bots that a user may be interested in engaging with. The suggestions may be made reactively and/or proactively.

In the reactive scenario, a user may expressly ask the messaging system or an associated bot to suggest a capability. For instance, the user may ask the messaging system to "start a poll." Even if the user does not know how to specifically invoke a specific polling bot, the messaging system can use natural language processing to interpret the user's intent and select a bot having an appropriate capability.

In the proactive scenario, the messaging service may analyze an ongoing conversation using a natural language processor. The natural language processor may output one or more intents of the conversation, each with a corresponding confidence score. For example, based on recent messages exchanged in the conversation, the system may estimate that the participants are interested in booking reservations at a restaurant with a confidence score of 75%, or alternatively attempting to arrange travel to the restaurant with a confidence score of 35%. In this scenario, because the confidence score associated with the "reservation" intent is higher than the "book travel" intent, the system may determine that it is most likely that the users are attempting to reserve seats at the restaurant.

Different bots may be available to service various intents. The bots may be stored in a bot catalog, which the system consults (in conjunction with the intent and other information interpreted by the natural language processor). The system may score or rank the bots based on the intents, user preferences, and contextual information from the conversation. The bot with the highest rank may be selected, and the system may suggest that one or more of the conversation participants use a capability of the bot; alternatively or in addition, the top n bots may be selected and offered to the participant(s).

Examples of capabilities that may be provided by the bots include starting a poll, adding stickers to the conversation, group coordination and planning capabilities, etc. These capabilities may be provided as part of a mini-app or other interactable interface within the messaging conversation; in some embodiments, the mini-app may be provided as part of a message from the bot into the conversation.

The mini-app may be presented to an initiating participant identified by the messaging service, to multiple participants, or to all participants. The mini-app may, in some embodiments, collect authorized information from the conversation, profiles for the conversation participants in the messaging service or on-file with the bot provider, linked calendars (if the user has provided access to their calendar), social networking graphs associated with the participants, and other sources. Based on this, some initial information may be propagated to the mini-app, which the initiating user may reference or use to configure the action to be performed by bot.

For example, if the conversation participants are trying to decide where to eat dinner, a polling bot that surveys the user may generate a poll or survey so that the conversation participants can indicate their preferences. The bot may retrieve dining options based on the conversation (e.g., "I want pizza!"), the user's profile in the messaging service or a linked social network (e.g., "My favorite food is sushi"), location information from the devices (e.g., all the participants are in downtown Boston), user preferences that are already on file with the polling bot (e.g., from a user account with the polling bot), and any other suitable sources. Based on this information, the polling bot may generate initial polling options and present them to the initiator. The initiator may add, remove, or modify options, and may instruct the bot to present the poll in the conversation. The bot may then send a message into the conversation with an interactable poll, or otherwise present the options in the conversation. Having thus conducted the poll, the bot may present the poll results in the conversation.

Polls may be created proactively or reactively. For example, assume a group of friends is talking about getting together. They are hungry, and someone says, "Where should we eat tonight?". A proactive system may detect an opportunity for a poll based on an analysis of the conversation, use the conversation text to create the poll's title, and allow the poll creator to customize their options before sending it into the thread. In a reactive case, a user may say something like "@M create a poll for what should we eat tonight x-place, y-place, or z-place?" (with the "@M" text segment invoking the bot-suggestion system) and the system may create the poll with "what should we eat tonight" as the title and "x-place", "y-place", and "z-place" as options.

The embodiments described herein have several advantages. In the proactive scenario where the system suggests one or more bots that a user may wish to use, the user may be able to access capabilities of the messaging service which the user was not aware existed. Even if the user knows that certain services are available, they may not know or remember how to invoke them; proactively offering bot suggestions allows a user to quickly easily access the bot capabilities. Accordingly, a user is more likely to use capabilities provided by the messaging service, which increases the value of the messaging service to the user. This provides the user with quick-messaging options that are highly personalized. Providing personalized recommendations for self-expression (such as stickers or animated GIFs) allows people to communicate without losing their individuality and personality more efficiently Even in the reactive scenario, where a user knows that a capability exists and asks the service to suggest bots to provide the capability, the user may still not know or remember how to specifically invoke the bot. For example, instead of issuing the command "@PollBot start poll: pizza; sushi; something else," the user can simply ask the messaging system to "start a poll" and the system can make suggestions as to which bots could provide that capability and what the format of the poll should be. Moreover, the natural language processor can propagate initial settings for the bot, which simplifies the setup process for the initiator. This can be done even if the user does not know the exact commands, format, or syntax for invoking the bot with certain setup options.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-$a$ may include components 122-1, 122-2, 122-3, 122-4, and 122-5. The embodiments are not limited in this context.

Exemplary Bots System

FIG. 1 illustrates a block diagram for a consumer-to-business communication system 100. In one embodiment, the consumer-to-business communication system 100 may comprise a computer-implemented system having software applications comprising one or more components. Although the consumer-to-business communication system 100 shown in FIG. 1 has a limited number of elements in a certain topology, it may be appreciated that the consumer-to-business communication system 100 may include more or less elements in alternate topologies as desired for a given implementation.

A consumer-to-business service 110 may serve as an intermediary between consumers and businesses. Consumers and businesses may both be users of the consumer-to-business service 110, with consumers represented via an individual user account and businesses represented by a commerce account and, possibly, one or more individual user accounts associated with the business, such as individual user accounts associated with representatives and other employees of the business. A consumer user may be represented with a user entity in a social graph. A business or other commercial user may be represented by a business entity in a social graph. The relationship between the consumer user and the commercial user may be represented by one or more edges between the user entity and business entity in the social graph.

The consumer-to-business service 110 may comprise a messaging system 140. The messaging system 140 may be generally arranged to receive, store, and deliver messages between individual entities such as individual users and collective entities such as businesses and other organizations. The messaging system 140 may store messages while messaging endpoints, such as messaging endpoint 125, are offline and deliver the messages once the messaging endpoints are available. The messaging system 140 may empower a user to use multiple messaging endpoints (e.g., a messaging client on a mobile device, a web browser on a personal computer) for the same user account, with the messaging system 140 keeping all of the messaging endpoints up-to-date as to the messaging state of the user account.

The consumer-to-business service 110 may comprise a social networking service 130. The social networking service 130 may maintain a social graph data structure representing a social graph. The social graph may represent relationships between entities, such as user entities, commerce entities, and any other sort of entity. The social graph may represent the relationships as graph relationships, in which all information is encoded as either being attached to a particular node in the graph or attached to a particular edge between two nodes in the graph. A messaging system 140 may be an element of a social networking service 130, with the social graph containing, at least in part, social-networking information. The whole of the consumer-to-business service 110 may be an element or composed of elements of a social networking service.

The consumer-to-business service 110 may comprise a consumer portal 150. The consumer portal 150 may be a unified entry point into the consumer-to-business service 110 for client applications being used by consumers. The consumer portal 150 may serve as a general user portal for non-commerce entities, including users that are not or do not engage in commerce using the consumer-to-business service 110. The consumer portal 150 may provide access to the messaging system 140 and the social networking service 130. In some embodiments, all access to the social networking service 130 may be mediated by the consumer portal 150 in which the information of the social networking service 130 is used and managed on behalf of the user without the user having direct access to some or all of the social graph information. In some embodiments, the user may have direct access to the messaging system 140 using their user account, with the consumer portal 150 limited to consumer functions of the consumer-to-business service 110 with general messaging functionality (e.g., messaging with friends) provided through direct network communication between the messaging endpoint 125 and the messaging system 140 without the mediation of the consumer portal 150.

The consumer-to-business service 110 may comprise a business portal 160. The business portal 160 may be a unified entry point into the consumer-to-business service 110 for client application being used by business entities. The business portal 160 may provide access to the messaging system 140 and the social networking service 130. In some embodiments, all access to the social networking service 130 may be mediated by a business portal 160 in which the information of the social networking service 130 is used and managed on behalf of the business entity without the business entity having direct access to some or all of the social graph information. In some embodiments, the business entity may have direct access to the messaging system 140 using their commerce account, with the business portal 160 limited to business functions of the consumer-to-business service 110 with general messaging functionality (e.g., messaging with customers) provided through direct network communication between one or more bots 190 and the messaging system 140 without the mediation of the business portal 160.

A user may participate in the consumer-to-business communication system 100 and interact with the consumer-to-business service 110 using a messaging endpoint 125 software application executing on a client device 120. The client device 120 may typically be a smartphone—a mobile phone capable of executing software applications that provide functionality beyond that of a conventional telephone—such as an iPhone®, Android® phone, or other smartphone. The messaging endpoint 125 may be specifically associated with a particular messaging system 140 that forms part of the consumer-to-business service 110 or may be a general-purpose messaging client operative to interact with a plurality of messaging services. The messaging endpoint 125 may interact with one or both of the consumer portal 150 and the messaging system 140 for the performance of messaging tasks and commerce tasks.

A business entity may be represented in a messaging system by a commerce representation comprising a collection of information for display to a user. A commerce representation may comprise a business page, the business page being the identity of a business within the consumer-to-business communication system 100. The business page may display information regarding a business entity. The business page may include information for the business entity, such as one or more of a physical location for the business entity, the operating hours of the physical location, or the hours in which the business entity (e.g., a representative of the business entity) is available for messaging through the consumer-to-business communication system 100. The business page may include social-networking information for the business entity, such as a list of friends of a viewing user that have "liked" or "followed" the business entity within a social network as may be represented in a social graph.

A commerce representation may not correspond precisely to a business entity. A single business entity, such as a business, may have multiple commerce representations and therefore multiple business pages. For example, a single business may have different representations for different brands owned and operated by the same business. A retailer or reseller may sell multiple brands and may have different representations for different brands that they sell. A business may have different representations for different geographic areas in which they operate, such as one business page for the United States, another for Europe, another for Russia, etc.

To aid a user in interacting with a service within a messaging context, services may be represented as bots 190. A bot may be a fully or partially automated front-end to a network-accessible service that can be represented as a participant in an interaction. In some instances, an interaction may comprise a messaging interaction embodied within a message thread, with the bots 190 comprising messaging bots. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between more than two users.

Bots 190 may interact with users using communication channels other than messaging. For example, a bot may comprise a voice bot operating via a voice system, such as a smartphone, personal computer, voice-activated appliance, or other device with which a user may interact via voice. In these embodiments, the voice system may perform voice recognition and voice generation on behalf of the bots 190. Other types of interactive systems may be used to mediate between bots 190 and users.

A messaging bot for a commerce representation may be presented in a messaging conversation in a messaging system 140. A user of the messaging system 140 may interact with a business by messaging with the messaging bot that comprises a virtual representation of the business. A messaging bot may specifically correspond to a commerce representation presented as a business page, with the messaging bot being the representation of the business page in a messaging context. Messaging with the bot may therefore extend the presence of a commerce representation from a business page, primarily dedicated to providing information from the business to users, to interactive messaging in which users and the business can engage in a conversation.

A business may use one or more commerce applications to engage with the messaging system 140. An application may correspond to a specific registration empowering access to the messaging system 140 and/or social networking service 130 via an application programming interface (API). An application may be registered with the messaging system 140 via various registered hooks for the application specifying how the application can be contacted by the messaging system 140. These hooks may be used to contact the application in response to events, such as user messaging, within the messaging system 140. An application may be assigned a secure token that may be used for authentication and the secure (e.g., encrypted) reception and sending of information with the messaging system 140. An application may correspond to a specific AppID with the messaging system 140 and/or social networking service 130. Because the business may surface multiple aspects of the services and products it provides via the agent, multiple different applications may be used by a business entity to interact with a user via the messaging system 140. Each application may be subscribed with the messaging system 140 to the one or more commerce representations, such as business pages, that it powers.

The network 180 may comprise any form of computer network operative to carry computer transmissions between computer devices. The network 180 may include one or both of intranets and the Internet. The network 180 may include cellular data and/or Wi-Fi data networks, such as may be used to provide connectivity to a mobile client device 120.

The consumer-to-business communication system 100 may use knowledge generated from interactions between users. The consumer-to-business communication system 100 may comprise a component of a social networking service 130 and may use knowledge generated from the broader interactions of the social networking service 130. As such, to protect the privacy of the users of the consumer-to-business communication system 100 and the larger social networking service 130, consumer-to-business communication system 100 may include an authorization server (or other suitable component(s)) that allows users to opt in to or opt out of having their actions logged by the consumer-to-business communication system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the consumer-to-business communication system 100 and other elements of a social networking service 130 through blocking, data hashing, anonymization, or other suitable techniques as appropriate. For example, while interactions between users of a social networking service 130 and the social networking service 130 may be used to learn media content preferences and the relationship between preferences for different pieces of content, these interactions may be anonymized prior to or as part of the learning process.

Figure 2:
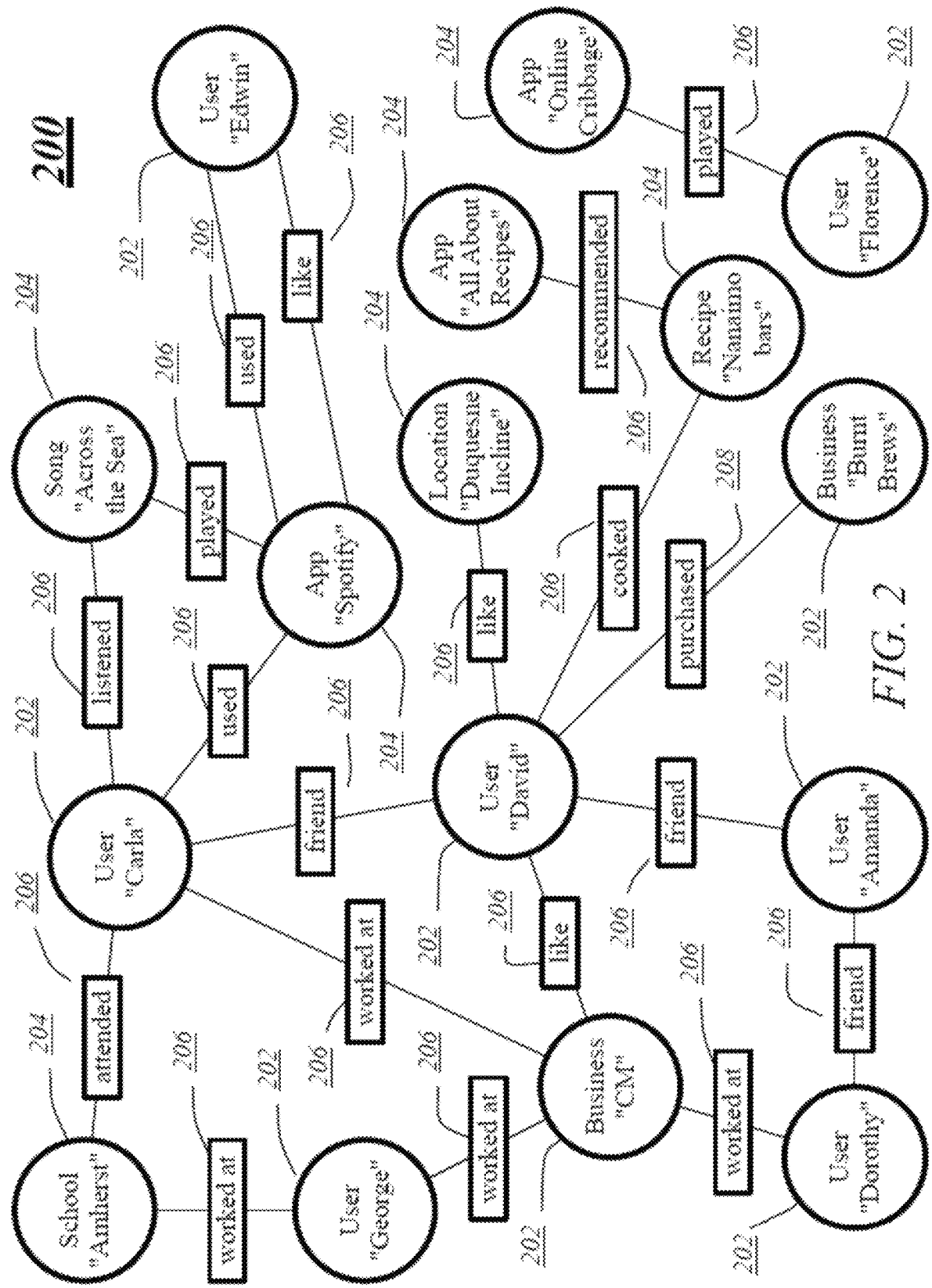
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
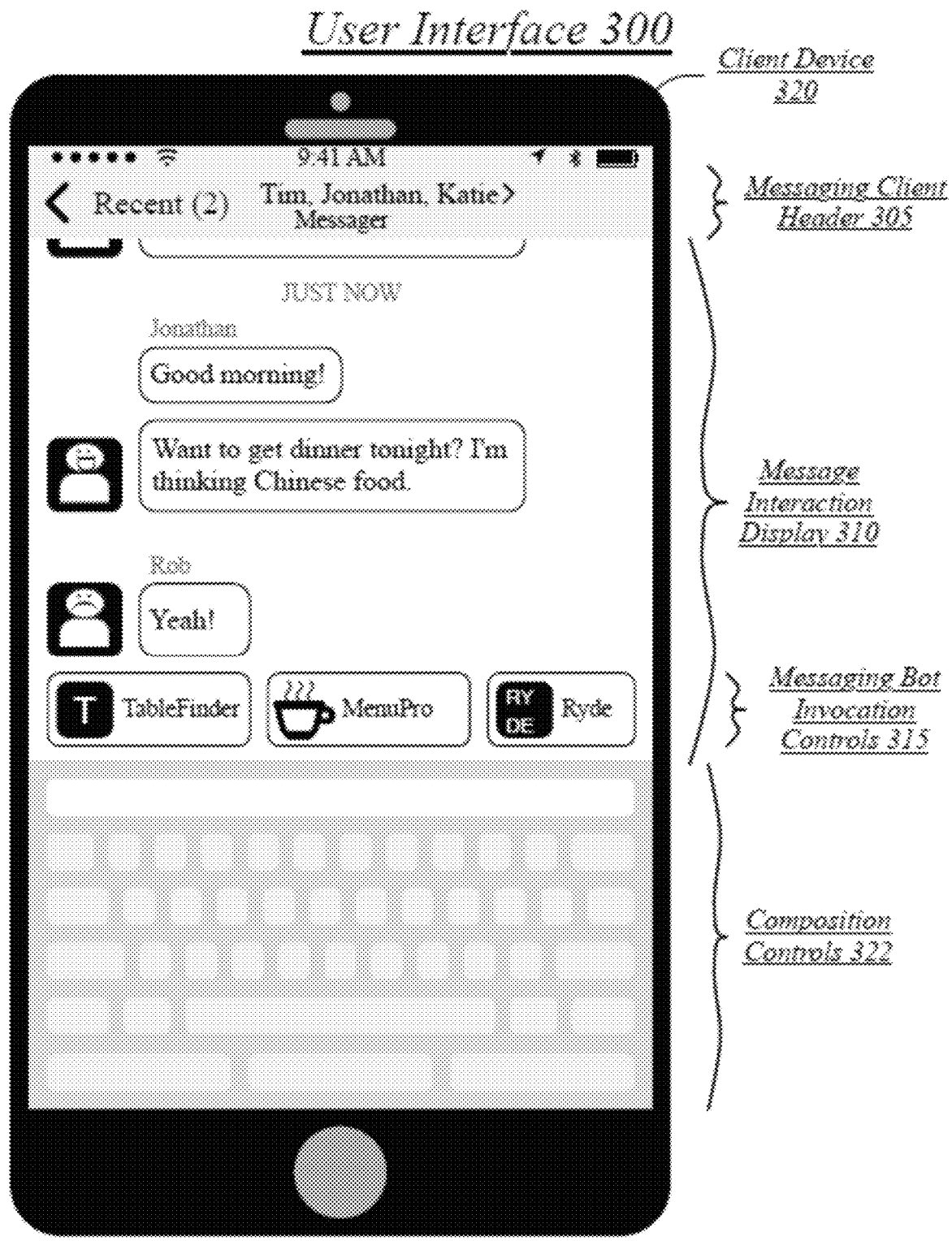
FIG. 3A illustrates an embodiment of a user interface with a message interaction display with messaging bot invocation controls.

FIG. 3A illustrates an embodiment of a user interface 300 with a message interaction display 310 with messaging bot invocation controls 315.

A client device 320 may correspond to any device used to access a consumer-to-business communication system 100. While in the illustrated embodiment of FIG. 3A the client device 320 resembles a smartphone device, it will be appreciated that the techniques described herein may be used with any type of device. The user interface 300 may generally correspond to a display of a message thread for the messaging system 140.

A messaging client may display a messaging client header 305. The messaging client header 305 may comprise a title for a message thread, such as the name of one or more users participating in the message thread, which may be selected according to real name, nick names, or other name information. The messaging client header 305 may comprise a control to return a user to an inbox view for the messaging client. An inbox view control may be augmented with a number of recent message threads with unread messages.

The user interface 300 for a message thread may include composition controls 322. Many, most, or nearly all of the composition controls 322 may empower access to and use of interface controls for the performance of various tasks, such as text entry, media selection, emoji selection, camera use, a social approval icon, etc. The controls may include text entry controls empowering the entering of text for the composition of text-based messages. The controls may include hardware controls. In some embodiments, controls may be touchscreen-based controls.

The user interface 300 for the message thread may comprise a message interaction display 310. The message interaction display 310 may comprise the messages exchanged within the message thread. The message interaction display 310 may be iteratively updated as additional messages are added to the message thread by the participants in the message thread. Messages may be displayed in association with an avatar for the user.

A messaging client and/or messaging system 140 may detect messaging content for use in selecting and configuring one or more messaging bots. Extracted messaging content may generally correspond to a word, phrase, sentence, sequence or interchange of messages, or other element of a message thread that a messaging system 140 associates with a potential action, option, or other suggestion. The messaging system 140 using identified messaging content may invoke suggested services, such as suggested messaging bots, related to the messaging content. Messaging content for extraction may be determined based on predetermined and pre-assigned associations between words and/or phrases and various suggestions, or may be automatically determined based on natural language programming techniques.

Detecting potential user interest in interacting with a messaging bot may invoke the display of messaging bot invocation controls 315. The messaging client may retrieve and display a plurality of suggested services, such as may correspond to suggests messaging bots, in a plurality of triggered messaging bot invocation controls 315. In some embodiments, the plurality of suggested services may be automatically displayed on response to the messaging client and/or messaging system 140 detecting a relevant context. The messaging bot invocation controls 315 may comprise a plurality of messaging bot options. A messaging bot invocation control may comprise a particular messaging bot associated with a particular service.

The messaging bot invocation controls 315 may comprise suggestions for services, as may be represented by messaging bots. The messaging bot invocation controls 315 may comprise a ranked list of suggested messaging bots. Suggested messaging bots may be determined based on a variety of techniques and based on a variety of factors. The ranking of the suggested messaging bots may be represented in the ordering of the messaging bot invocation controls 315, with higher-ranked messaging bots displayed more prominently and lower-ranked messaging bots displayed less prominently. For instance, some lower-ranked messaging bots may be arranged such that they are completely or partially off-screen and only revealed (or fully revealed) if the user navigations through the messaging bot invocation controls 315.

Information may be extracted from the content, or a portion of the content, of the messaging interaction embodied in a message thread. In some cases, a recent portion of the message thread may be used, such as by detecting a current period of engagement with the message thread and analyzing the message thread for that current period. The recent portion of a message thread may be defined according to a variety of techniques. In some cases, the recent portion may be defined according to a predefined length of time, with the recent portion being the segment of the thread exchanged during an extent of time spanning a length equal to the predefined length of time and concluding at the current time. In some cases, the recent portion may be determined as spanning a variable length, such as by detecting the most recent break in conversation of sufficient length, which may be predefined, to indicate temporary disengagement with the message thread. For example, the recent portion of the message thread may be the maximum extent of the thread concluding at the current time that does not include any gap in conversation longer than one hour. Other techniques for defining a recent portion of a thread may be used.

Selecting a messaging bot invocation control of the plurality of messaging bot invocation controls 315 may invoke an interface for interaction with that particular selected messaging bot.

In some embodiments, a message thread may be a multi-user message thread in which multiple participants engage in a message interaction. However, in an alternative embodiment, the message thread may be a bot-request thread in which a user engages directly and purposefully with a system that can recommend and guide the user to various messaging bots. A user may select a bot-request thread from a list of bots, engage with a bot-request engine to receive recommended bots, and then engage with the bots in the bot-request thread. For example, rather than asking "Want to get dinner tonight? I'm thinking Chinese food." a user might submit "I'd like to get dinner tonight and am thinking Chinese food." in the bot-request thread, with the bot-request system recommending messaging bots to the user in response. The messaging bot invocation controls 315 may then be presented, not as a response to the detection of an opportunity for recommendations implicit in a user-to-user interaction, but instead as a response to a direct query by the user.

In another alternative embodiment, a request for assistance from a messaging bot may be directly invoked within a user-to-user message thread. A bot request may be made by directly addressing the bot-suggestion system. Directly addressing the bot-suggestion system may be performed using a variety of techniques. For instance, the bot-suggestions system may be addressed by prefixing a text-based request with a text segment indicating that the bot-suggestion system is being addressed. For example, a user might enter "@M I'd like to get dinner tonight and am thinking Chinese food," with the "@M" text segment invoking the bot-suggestion system. Alternatively or additionally, a control may be provided as part of the composition controls 322 empowering addressing of the bot-suggestion system with the user-to-user message thread. In some embodiments, where the bot-suggestion system is directly invoked, the invocation of the bot-suggestion system, any responses by the bot-suggestion system (such as messaging bot invocation controls 315 or other responses), or interactions with the messaging bot may only be shown to the user of the client device 320 that invokes the bot-suggestion system and any bots, with the messaging system 140 refraining from providing these interactions to other client devices. This creates a side-conversation within a user-to-user message thread between the invoking user and the bot-suggestion system and messaging bots that is private from any other participants in the thread. However, in other embodiments, other client devices, and therefore their users, may be provided some or all of these interactions.

Figure 3B:
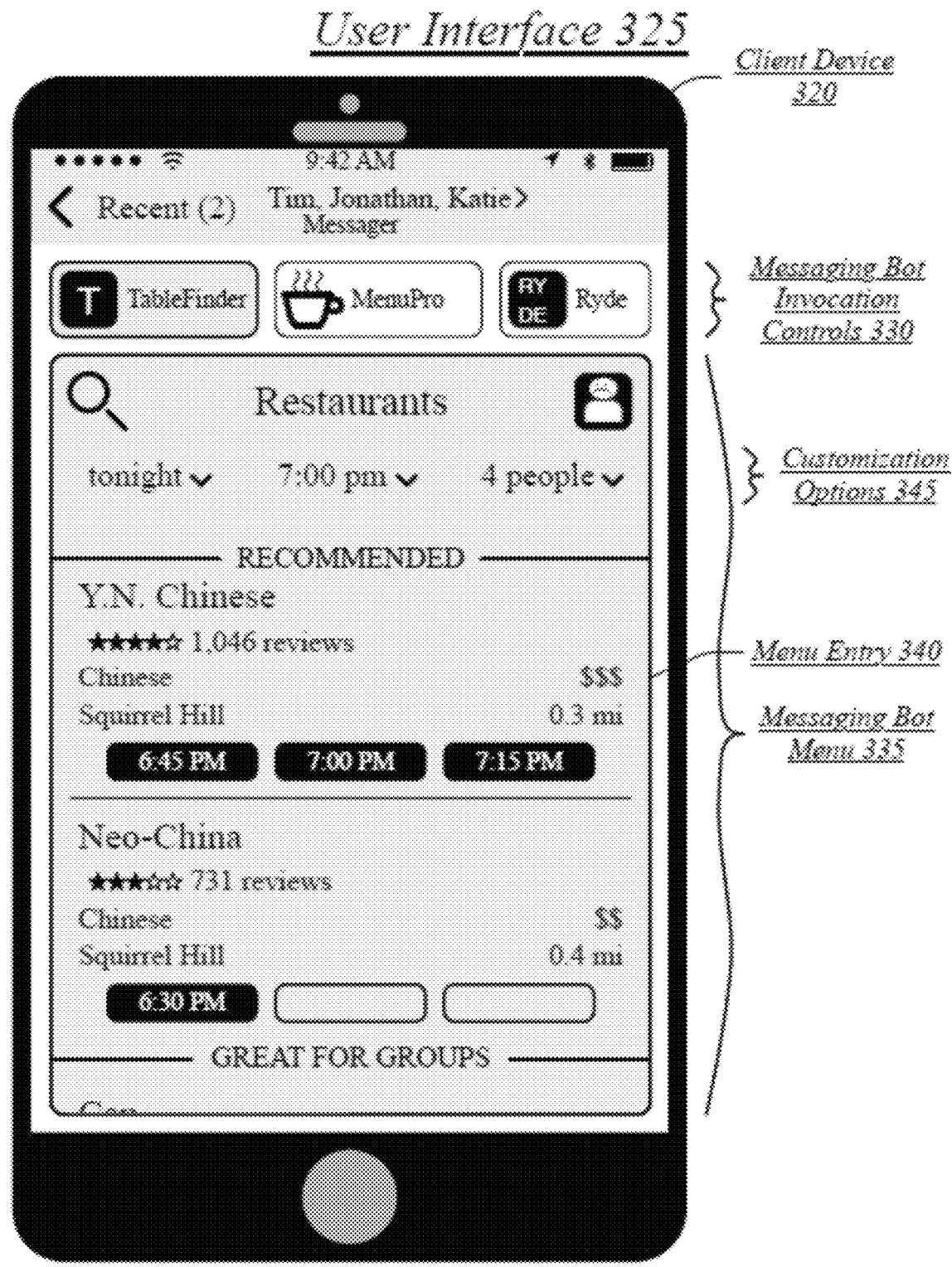
FIG. 3B illustrates an embodiment of a user interface with a messaging bot menu.

FIG. 3B illustrates an embodiment of a user interface 325 with a messaging bot menu 335.

A messaging bot menu 335 for a particular messaging bot may be displayed in response to a messaging bot invocation control for that messaging bot being selected by a user of a client device 320. The messaging bot menu 335 may be displayed in association with the messaging thread from which it is invoked.

The messaging bot menu 335 is a display element specifically associated with a particular messaging bot and empowers a user to interact with an interface for the messaging bot within the context of the message thread from which it is invoked. The user of the client device 320 may move into the messaging bot menu 335, interact with the messaging bot menu 335 to interact with the messaging bot, back out of the messaging bot menu 335 to re-engage with the messaging conversation in the message thread, move back into the messaging bot menu 335 to re-engage with the messaging bot, move between different messaging bot menus, and generally dynamically interact with messaging bot menus within the context of the message thread so as to select and interact with a messaging bot while retaining a connection to an ongoing messaging conversation.

Messaging bot invocation controls 330 may be displayed adjacent to the messaging bot menu 335. The messaging bot invocation controls 330 may be substantially similar to the messaging bot invocation controls 315 displayed adjacent to a messaging conversation, but relocated to a top portion of the screen of the client device 320. The relocated messaging bot invocation controls 330 may be tabs for selecting between the various messaging bot menus. As such, selecting a currently-unselected messaging bot invocation control may transition the messaging client to display the messaging bot menu for the now-selected messaging bot invocation control. The particular messaging bot invocation control associated with the current messaging bot menu 335 may be displayed with a distinct visual style, so as to indicate that the messaging bot for that messaging bot invocation control currently has the active messaging bot menu 335. Re-selecting the control for the currently-active messaging bot menu 335 may minimize the messaging bot menu 335 to empower the user to return to the view of the messaging bot conversation in a messaging interaction display 310.

The messaging bot menu 335 may comprise a plurality of customization options 345. These customization options 345 comprise settings configuring a messaging bot as set by controls for the messaging bot provided as part of the messaging bot menu 335. Customization options 345 may be initially set automatically based on the context of the message thread, based on the content of the specific messaging interaction prompting the display of the messaging bot invocation controls 315, based on user information for the message thread and/or the specific messaging interaction, and/or according to other analysis of the context of the messaging bot menu 335. These customization options 345 may then be retained by the user or modified using the controls of the messaging bot menu 335.

In general, the messaging bot menu 335 is configured based on the customization options 345, whether customization options 345 set automatically or set manually by the user of the client device 320. In some instances, a messaging bot menu 335 may include one or more menu entries. For example, for a messaging bot menu 335 designed for configuring, displaying, and selecting restaurant recommendations, a menu entry 340 may correspond to a particular restaurant. A menu entry 340 may include a name, location, pricing information, performance information, and other information relating to the menu entry 340. A menu entry 340 may include one or more controls. For example, a control for a restaurant menu may empower the selection of both a restaurant and a particular available reservation time for the restaurant. In these instances, the menu entries are determined at least in part based on the customization options 345. The menu entries may also be determined in part on additional information, such as information relating to a message thread or participants in a message thread.

Figure 3C:
FIG. 3C illustrates an embodiment of a user interface with a messaging bot menu with a multi-user request control.

FIG. 3C illustrates an embodiment of a user interface 350 with a messaging bot menu with a multi-user request control 355.

In some cases, an interface for interacting with the consumer-to-business service 110 may be distributed across multiple client devices, such that multiple users on multiple client devices contribute to the configuration of a service request. A primary user may initiate an interaction with a messaging bot and use a primary interface for interacting with that messaging bot. However, the other users in a message thread may be offered the opportunity to engage with the messaging bot in concert with the primary user and any other secondary users.

In some cases, an interface for a messaging bot, or other agent using the consumer-to-business service 110 to communicate with users, may be instantiated across multiple client devices based on the selection of the agent by a primary user. In other cases, an agent may initially instantiate a single-user interface on a single client device and optionally or only eventually instantiate on multiple client devices. The interface on the instantiating client device may be a primary multi-user interface being the primary or controlling interface for the multi-user interface.

A multi-user request control 355 may be used to instantiate secondary user interfaces on secondary client devices. The secondary client device may be identified as those being currently used by other participants in a group message thread. The multi-user request control 355 may initiate the instantiation of secondary user interface on one or more other client devices in order to configure a service request. In the illustrated embodiment, the multi-user request control 355 instantiates a user interface on the secondary client device asking the users of the secondary client devices to indicate whether or not they should be included in the count of people who will be participating in the requested service.

Figure 3D:
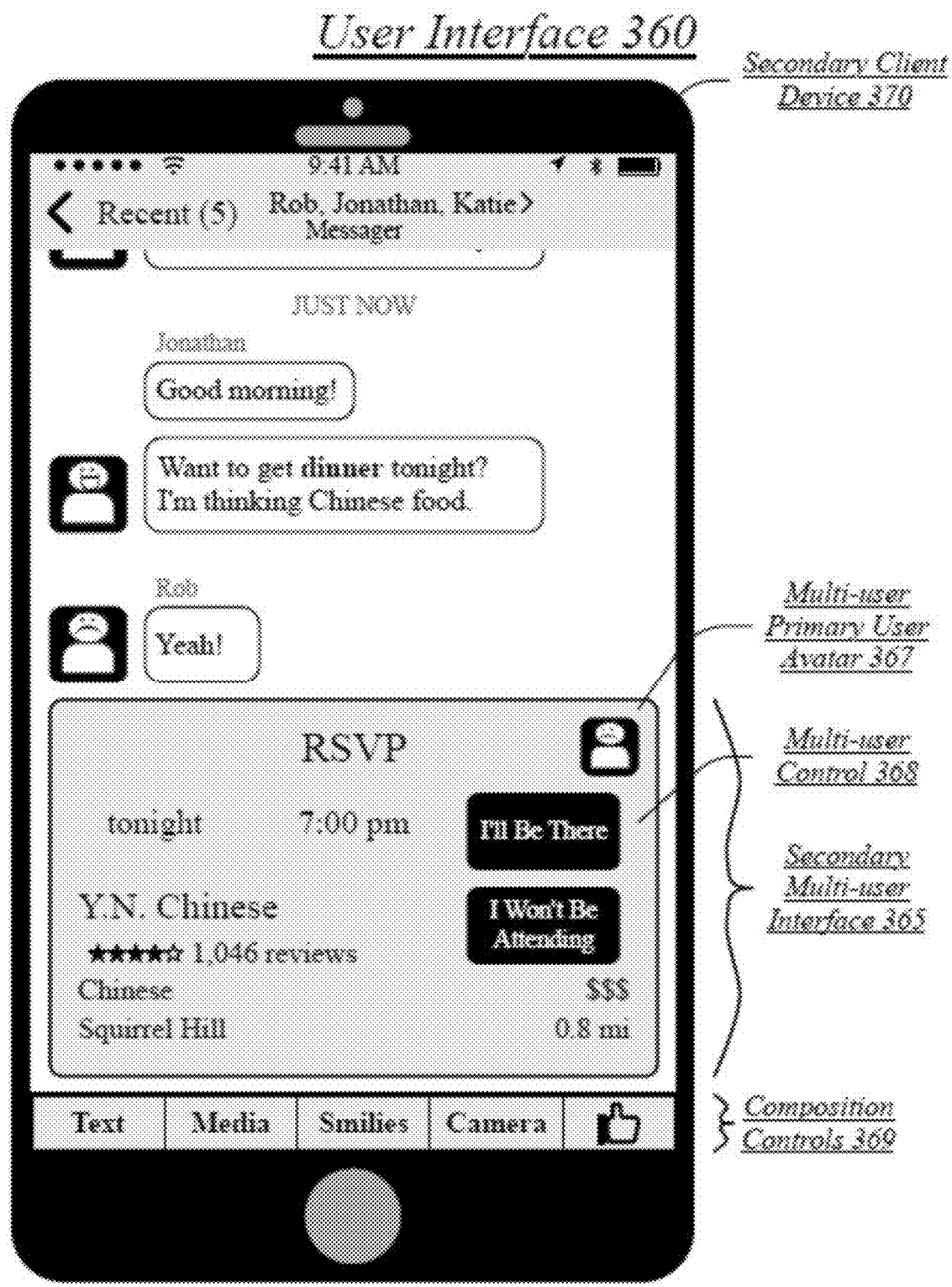
FIG. 3D illustrates an embodiment of a user interface with a secondary multi-user interface.

FIG. 3D illustrates an embodiment of a user interface 360 with a secondary multi-user interface 365.

The user interface 360 may be displayed on a secondary client device 370. A secondary client device 370 may comprise a client device used by a participant in a message thread other than user who initiated contact with a messaging bot.

The user interface 360 for the secondary client device 370 may include a secondary multi-user interface 365 instantiated on the secondary client device 370 based on a primary multi-user interface on a primary client device. The secondary multi-user interface 365 may include information specified in the primary multi-user interface. For example, for a restaurant reservation, the primary multi-user interface may determine the specific restaurant, date, and time for the reservation. The secondary multi-user interface 365 may include a multi-user control 368 of one or more multi-user controls. The multi-user control 368 on a secondary multi-user interface may empower the participant in the message thread to contribute to the configuration of a service request. For example, where a service request is being configured, one or more multi-user controls may empower a user to register whether or not they want to be included in the service being requested.

The user interface 360 for a message thread may include composition controls 369. Many, most, or nearly all of the composition controls 369 may empower access to and use of interface controls for the performance of various tasks, such as text entry, media selection, emoji selection, camera use, a social approval icon, etc. The controls may include text entry controls empowering the entering of text for the composition of text-based messages. The controls may include hardware controls. In some embodiments, controls may be touchscreen-based controls.

Figure 3E:
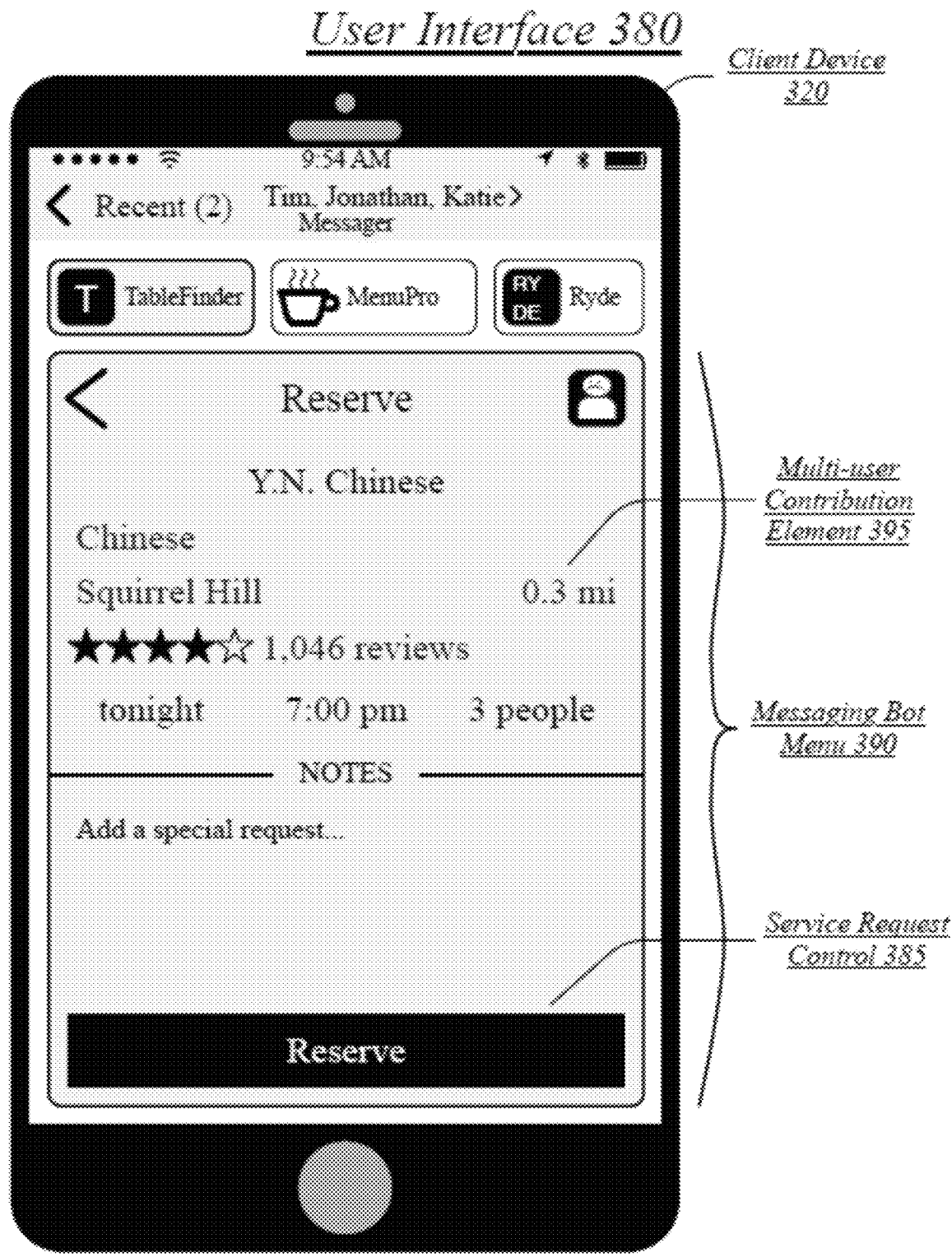
FIG. 3E illustrates an embodiment of a user interface for a messaging bot menu for a configured service request including a multi-user contribution element.

FIG. 3E illustrates an embodiment of a user interface 380 for a messaging bot menu 390 for a configured service request including a multi-user contribution element 395.

A messaging bot menu 390 may advance to a point where a service request has been sufficiently configured as to allow a service request. Once the messaging bot menu 390 has reached this state, a service request control 385 may be displayed. The service request control 385 empowers a user to request that a service be performed.

The messaging bot menu 390 for a configured service request may include options configured based on the multi-user interface, where at least a portion of the configured options are based on the participation in the multi-user interface by users of the one or more secondary multi-user interfaces. The configured options may include a multi-user contribution element 395, where the multi-user contribution element 395 reflects user interface interactions on one or more secondary client devices other than the primary client device 320 for the multi-user interface. In the illustrated embodiment, the multi-user contribution element 395 reflects the results of secondary multi-user interfaces collecting information on whether participants in a message thread will join a group reservation.

Figure 4A:
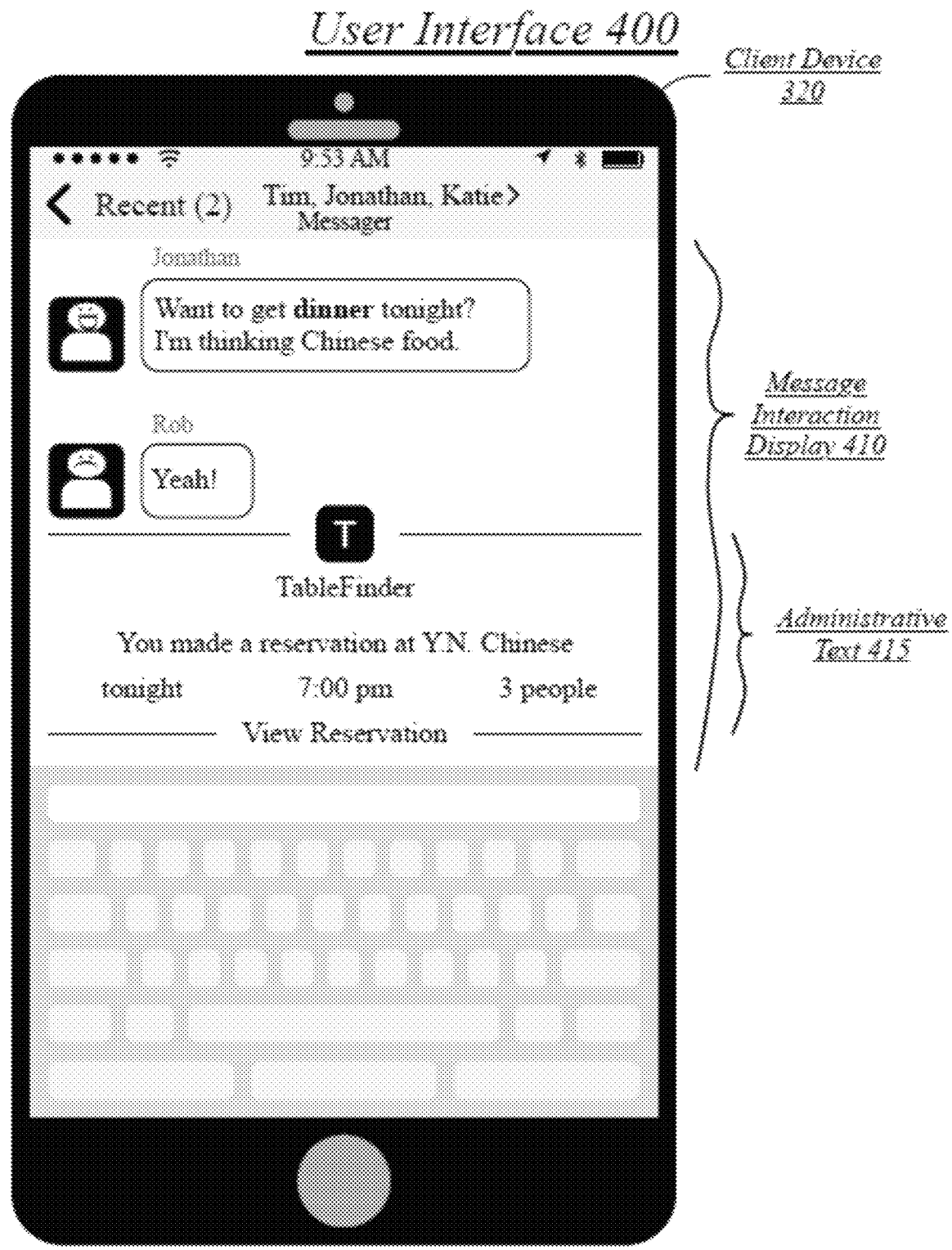
FIG. 4A illustrates an embodiment of a user interface with a message interaction display with administrative text communicating a service request.

FIG. 4A illustrates an embodiment of a user interface 400 with a message interaction display 410 with administrative text 415 communicating a service request.

Figure 4B:
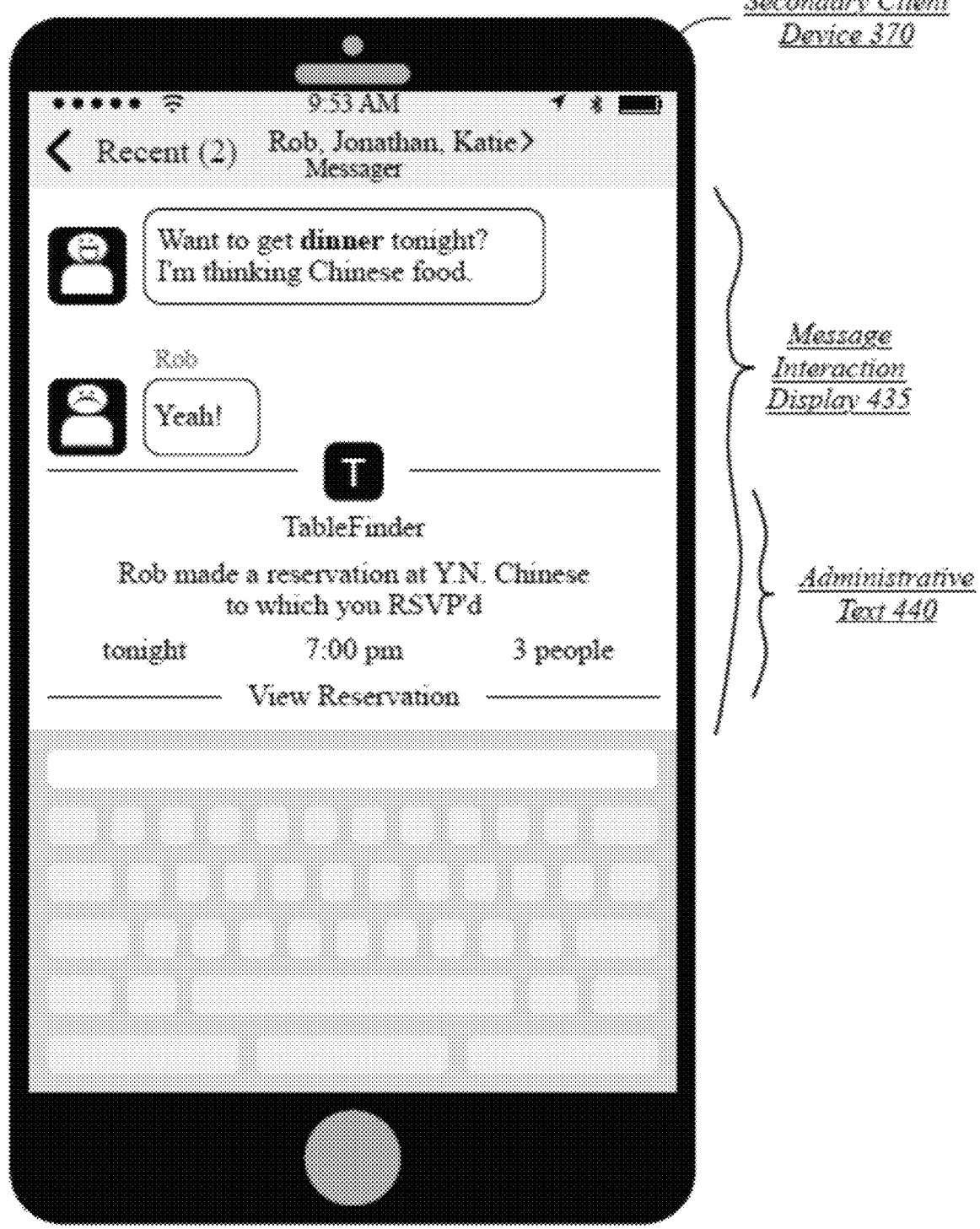
FIG. 4B illustrates an embodiment of a user interface with a message interaction display with administrative text communicating a service request customized to a secondary user of a multiple-user interface.

Once a user has selected a service request control 385, or otherwise requested a service from a messaging bot, the messaging bot may provide administrative text 415 to the messaging system 140, the administrative text 415 communicating the configured service. The administrative text 415 is then provided by the messaging system 140 to the client device 320 for display as part of the messaging interaction display 410. The administrative text 415 may also be distributed to other client devices belonging to the user and to client devices associated with other participants in the message thread. The administrative text 415 may include text, images, controls, or any other element. The administrative text 415 may be customized based on the viewer. For example, the administrative text may identify the user requesting a service differently to that user and to other users FIG. 4B illustrates an embodiment of a user interface 425 with a message interaction display 435 with administrative text 440 communicating a service request customized to a secondary user of a multiple-user interface.

The administrative text 440 is provided to the message interaction display 435 on a secondary client device 370. Administrative text may be customized to each client device for the participants in a message thread. The administrative text 440 for a secondary client device 720 may communicate the service request that the user of the secondary client device 370 participated in the configuration of. The administrative text 440 for a secondary client device 370 may reflect the specific contributions of the secondary client device 370. For example, for a request for a service, the administrative text 440 may reflect whether the user opted to participate in the service request. In some embodiments, a user that declines to participate in a service request may be exempted from receiving the administrative text, such that administrative text is sent to those and only those users that opted to participate in the service request.

Figure 5:
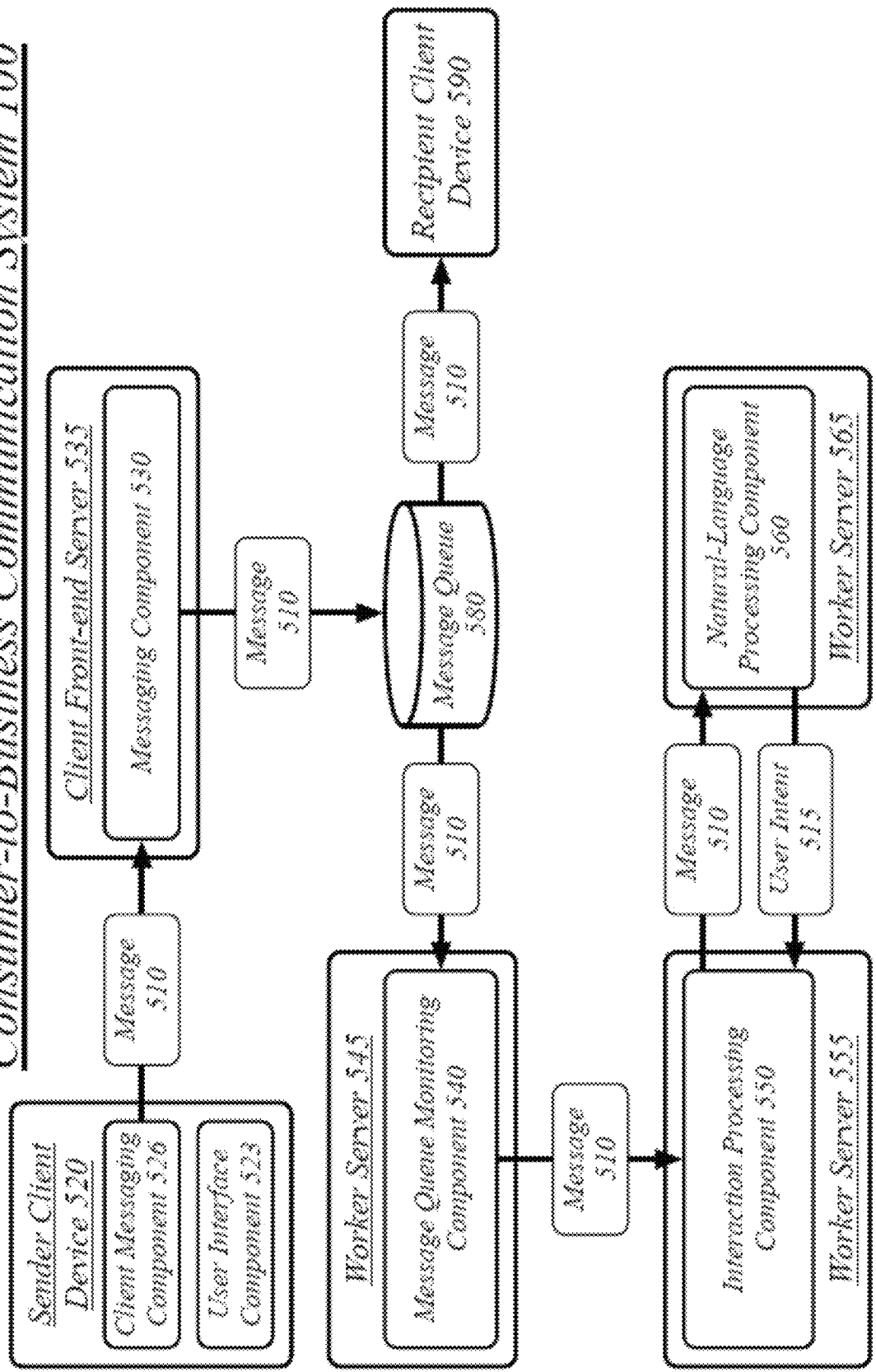
FIG. 5 illustrates an embodiment of a consumer-to-business messaging system determining a user intent based on a messaging interaction.

FIG. 5 illustrates an embodiment of a consumer-to-business communication system 100 determining a user intent 515 based on a messaging interaction.

A messaging system 140 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a client front-end server 535 may be interpreted as using the network interface controller for network access to a communications network for the transmission or reception of information.

A messaging client may comprise a user interface component 523. A user interface component 523 may be generally arranged to display user interfaces to a user of a client device and to receive user commands for the messaging client for the client device. A messaging client may comprise a client messaging component 526. A client messaging component 526 may be generally arranged to conduct messaging interactions on the behalf of the messaging client via communication with the client front-end server 535.

A client front-end server 535 may be generally arranged to act as a network access point to the messaging system 140 for client devices such as sender client device 520. The client front-end server 535 may comprise a messaging component 530, the messaging component 530 generally arranged to act as a network access point to messaging services for the messaging system 140. The messaging component 530 may receive messages from client devices and add the messages to message queues.

A message queue 580 may be specifically associated with the user of sender client device 520, such as by being uniquely associated within the messaging system 140 with a user account for the user of sender client device 520. The message queue 580 may be a single queue used for all messaging endpoints used by this user. The message queue 580 may comprise a representation of updates in a strict linear order. The message queue 580 may be organized as a data unit according to a variety of techniques. The message queue 580 may be stored in semi-persistent memory, persistent storage, both semi-persistent memory and persistent storage, or a combination of the two. The message queue 580 may be organized according to a variety of data structures, including linked lists, arrays, and other techniques for organizing queues. The message queue 580 may generally comprise a first-in-first-out (FIFO) queue in which no update will be removed or retrieved from the queue before any updates that were received prior to it.

The messaging system 140 may comprise one or more worker servers, such as worker servers 545, 555, 565. In general, the messaging system 140 may comprise a plurality of worker servers that may be assigned to various tasks. A worker server 545 may comprise a message queue monitoring component 540, the message queue monitoring component 540 arranged to monitor updates, such as may comprise messages, in the message queue 580 and other message queues of the messaging system 140 for various flags, indicators, and other information. A worker server 55 may comprise an interaction processing component 550, the interaction processing component 550 operative to manage the generation of a user intent 515 based on the contents of a messaging interaction. A worker server 565 may comprise a natural-language processing component 560, the natural-language processing (NLP) component 560 operative to use natural-language processing techniques to analyze messaging interactions to analyze messaging interactions and generate user intent 515 based on the messaging interactions.

The NLP component 560 may comprise a natural-language machine-learning component operative to use natural-language machine-learning techniques to improve its NLP operations.

The interaction processing component 550 may interface with the NLP component 560. The NLP component 560 performs natural-language processing for the consumer-to-business communication system 100. The performance of natural-language processing may include the analysis the contents of a messaging interaction to determine an intent of the messaging interaction. The intent represents a goal being sought to by the messaging interaction. For instance, people discussing where to get dinner may have an intent of "dinning," "eating," "restaurant," or other related term. The interaction processing component 550 may provide the content of a messaging interaction, including one or more messages, to the NLP component 560 and the NLP component 560 replies with the user intent 515, or multiple user intents, it detects for that interaction. The NLP component 560 may be implemented using known natural language processing (NLP) and machine learning (ML) techniques.

The message queue monitoring component 540 monitors a messaging interaction. This messaging interaction is exchanged via a messaging system 140. This messaging interaction involving at least one client device, such as a sender client device 520 and/or a recipient client device 590. A message 510 may be sent from a client messaging component 526 of a messaging client on a sender client device 520. This message 510 is associated with a message thread, the message thread involving two or more participants, including the user of the sender client device 520. This message 510 comprises a portion of the messaging interaction of a message thread.

The message 510 is received by the messaging component 530 of the client front-end server 535 and is added to a message queue 580 associated with the sender. The message 510 is distributed using the message queue 580 to the recipient client device 590. The message queue monitoring component 540 also receives the message 510 and provides it to the interaction processing component 550.

The interaction processing component 550 provides the message 510 to the NLP component 560 and receives the user intent 515 in response. The message 510 may be provided to the NLP component 560 as part of a repository of multiple messages, so as to empower the analysis of a messaging interaction as a whole. As such, the interaction processing component 550 determines determine a user intent for the messaging interaction by submitting at least a portion of the messaging interaction to a NLP component 560 and receiving the user intent 515 from the NLP component 560 in response to submitting at least the portion of the messaging interaction to the NLP component 560. The interaction processing component 550 may therefore detect the user intent 515 for the messaging interaction by using the NLP component 560.

Figure 6:
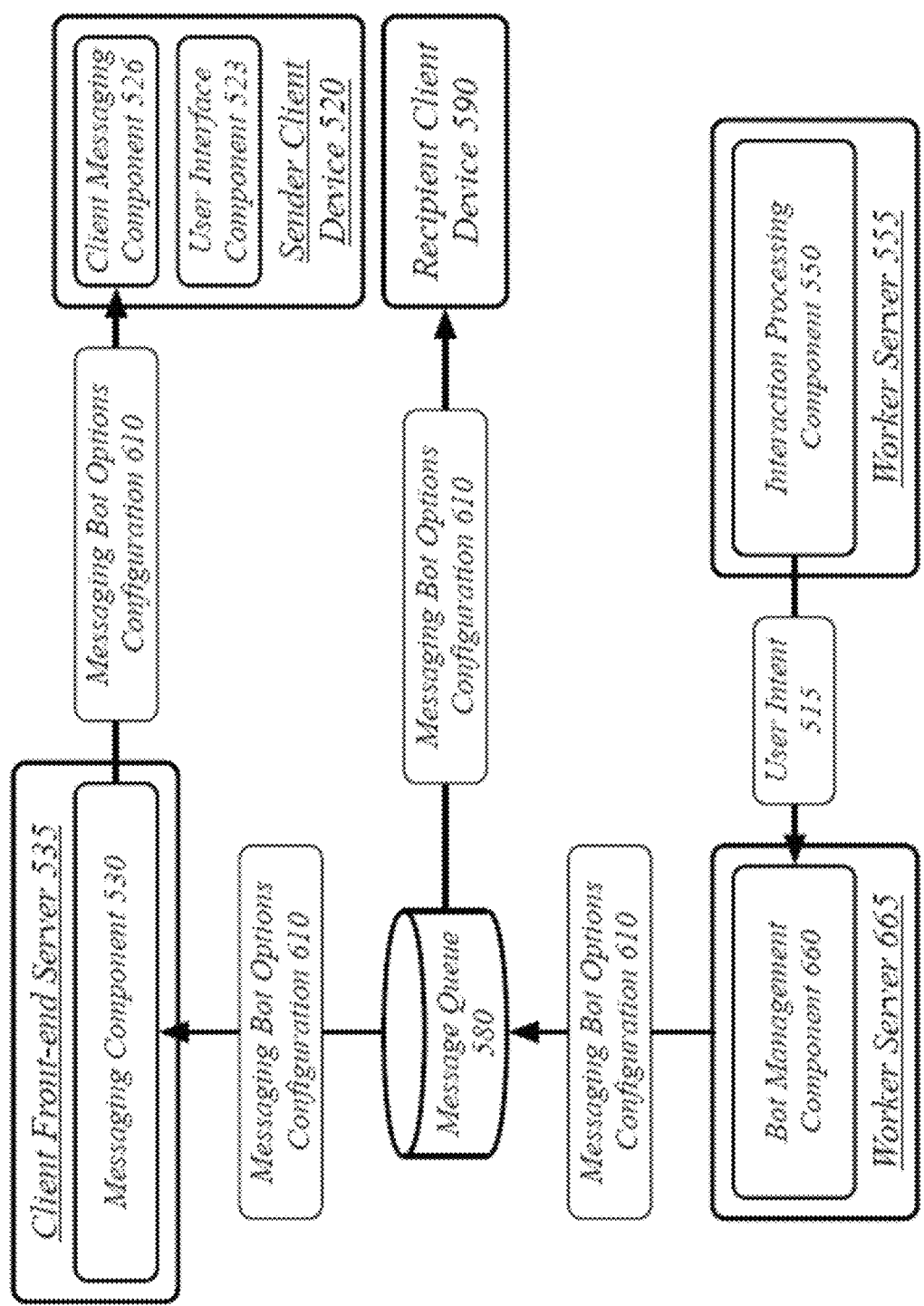
FIG. 6 illustrates an embodiment of a consumer-to-business messaging system determining a messaging bot options configuration based on a user intent.

FIG. 6 illustrates an embodiment of a consumer-to-business communication system 100 determining a messaging bot options configuration based on a user intent 515.

In some embodiments, a consumer-to-business communication system 100 may include a bot management component 660 that acts as an access point to messaging bot services for the consumer-to-business communication system 100. The bot management component 660 may act as an intermediary between the servers of the messaging system 140 and one or more internal and/or external bot execution servers. The bot management component 660 may comprise a bot framework generally arranged to provide an accessible framework to the messaging bot system. The bot management component 660 may be executed by a worker server 665 substantially similar to the worker servers 545, 555, 565 described with reference to FIG. 5.

In some cases, messaging bots may be executed by servers external to the consumer-to-business communication system 100, such as an external bot server operated by the service associated with the bot. A bot management component 660 may determine an external bot server for the service associated with the messaging bot. The bot management component 660 may submit messages to the messaging bot by sending the messages to the external bot server associated with the messaging bot. In some embodiments, submitting messages may comprise extracting message content and transmitting the message content to the external bot server using a bot server interaction application programming interface (API). Bot messages from the messaging bots may similarly be received by the bot management component 660 from an external bot server.

In other cases, messaging bots may be executed by the servers of the consumer-to-business communication system 100. The bot management component 660 may determine a hosted bot server for the service associated with a messaging bot. A hosted bot server may comprise a bot server maintained by the provider of the consumer-to-business communication system 100. The bot management component 660 may submit messages to the messaging bot by sending the messages to the hosted bot server associated with the messaging bot and may receive messages from the messaging bot by receiving them from the hosted bot server.

The bot management component 660 receives the user intent 515 from the interaction processing component 550 and determines a messaging bot options configuration 610 for the client device based on the user intent 515. The messaging bot options configuration 610 configures one or more client devices with interface controls empowering the one or more users of the one or more client devices to engage with one or more messaging bots.

The bot management component 660 then sends the messaging bot options configuration 610 to the sending client device 520 in response to the change in the context of the messaging interaction enacted by the message 510 being sent by the sender client device 520. Sending the messaging bot options configuration 610 to the sender client device 520 may comprise adding the messaging bot options configuration 610 to a message queue 580, such as a message queue 580 associated with a message thread in which the messaging interaction is occurring. The messaging bot options configuration is then distributed to the sender client device 520 by a server messaging component 530 retrieving the messaging bot options configuration 610 from the message queue 580 and delivering it to the client messaging component 526. The messaging bot options configuration 610 may be distributed to every user and client device involved in the messaging interaction, such as every client device belonging to every participant in the message thread. As such, a recipient client device 590 for the message 510 may also receive the messaging bot options configuration 610 generated in response to the message 510. In some embodiments, a messaging bot options configuration 610 may be distinctly configured for a primary client that initiated a messaging bot interaction and one or more secondary clients that are present in the message thread but did not initiate the messaging bot interaction.

A messaging interaction comprises a plurality of exchanged messages. This plurality of exchanged messages includes a most-recent message 510 of the message interaction. A message package sent to the client device via the messaging component 530, with this message package associated with the most-recent message 510, may be used to deliver the messaging bot options configuration 610. A message package sent to the sender client device 510 may be used to confirm receipt of the message 510 by the messaging system 140, may be used to report delivery of the message 510 to one or more recipient users, and/or may be used to report that a recipient user has viewed the message 510. A message package sent to a recipient client device 590 may comprise both the message 510, as may be the initial delivery of the message 510 to the recipient client device 590. In either case, the message package may additionally include the messaging bot options configuration 610.

In general, the message 510 may be sent to every client device related to a message thread, including the client device used to send the message 510. This message 510 may be augmented in the package used to deliver the message 510 with the messaging bot options configuration 610. The messaging bot options configuration 610 configures the messaging interface for the messaging client in displaying a message thread with controls empowering interactions with a messaging bot. Therefore, the bot management component 660 is operative to send a message package to the client device, the message package associated with the most-recent message 510, such that the message package comprises the messaging bot options configuration 610. This message package updates the client device with the most-recent message 510. In some cases, this most-recent message 510 is received from a different client device than the one receiving the message package. In some cases, the message package 510 may acknowledge receipt of the most-recent message from the client device.

In some instances, the messaging bot options configuration 610 may be a messaging bot menu associated with a messaging bot. The messaging bot menu is customized based on the user intent 515. The messaging bot menu may consist of a plurality of user-customizable options. Customizing the messaging bot menu based on the user intent may consist of pre-filling one or more of the user-customizable options based on the user intent. The messaging bot menu may comprise a later stage or second stage of providing messaging bot options configurations to a client device, with a first stage being messaging bot options configurations and the second stage being a customized messaging bot menu provided in response to an activation of a messaging bot invocation control.

In some instances, the messaging bot options configuration 610 may consist of a plurality of messaging bot invocation controls. Each of the messaging bot invocation controls is associated with a different messaging bot. This plurality of messaging bot invocation controls is selected based on the user intent 515. The user intent 515 may reflect a user-expressed goal or subject of a messaging interaction. Various messaging bots may be associated with this user intent 515. For instance, messaging bots may be assigned one or more user intents during a registration with the consumer-to-business communication system 100. A plurality of messaging bots associated with the user intent 515 are determined and provided to a client device. In some instances, the plurality of messaging bot invocation controls may be additionally selected based on a user context. A user context may consist of one or more of a user location and a local user time, without limitation. The plurality of messaging bot invocation controls may additionally be selected based on a user profile, such as based on user service preference information stored in the user profile.

After the delivery of a messaging bot options configuration 610 comprising messaging bot invocation controls, the user of the client device may select one of the messaging bot invocation controls. The messaging component 550 may then receive a user messaging bot selection of a selected messaging bot invocation control of the plurality of messaging bot invocation controls from the client device. A selected messaging bot invocation control is associated with a selected messaging bot. The user messaging bot selection is passed to the bot management component 660, which then sends a messaging bot interface to the client device in response. This messaging bot interface may comprise, in some instances, a messaging bot menu.

To process the messaging bot selection, the bot management component 660 sends a messaging bot invocation message to a bot server associated with the selected messaging bot. The messaging bot invocation message includes the user intent 515 to empower the messaging bot to configure itself according to the user intent 515. In some instances, the bot server may be hosted by the consumer-to-business communication system 100. In other instances, the bot server may be externally hosted, such as by the developer of the messaging bot. The bot management component 660 then receives a messaging bot interface specification from the bot server in response to the messaging bot invocation message, where this messaging bot interface is based on the messaging bot interface specification.

The messaging component 530 may instantiate a multiple-user interface on a plurality of client devices. The instantiating indicates display of a at least a portion of the multiple-user interface on each of the plurality of client devices. In response, a messaging client on each of the plurality of client devices displays at least a portion of the multiple-user interface. The messaging component receives a user-interface interaction from a first client device of the plurality of client devices and updates the multiple-user interface on the plurality of client devices based on the user-interface interaction. The messaging component 530 may receive a multiple-user application initiation from an initiating client device of the plurality of client devices and instantiate the multiple-user interface on the plurality of client devices in response to the multiple-user application initiation.

A multiple-user application initiation may be associated with a message thread for a messaging system. The message thread may be associated with a plurality of participant user accounts, with the plurality of participant user accounts associated with the plurality of client devices. The multiple-user interface is instantiated on the plurality of client devices based on the plurality of participant user accounts being associated with the plurality of client devices for the plurality of participant user accounts in the message thread.

The messaging component 530 may update the multiple-user interface on the plurality of client devices by distributing a user-interface update object based on the association between the plurality of participant user accounts and the message thread. The user-interface update object may be distributed using a message queue 580, with the object queued for distribution to the plurality of client devices.

An initiating client device may be associated with an initiating user account of the plurality of participant user accounts. The initiating user account may be used as a primary account for interaction with a bot, where a requested service is requested as being a request from the initiating user account. The messaging component 530 may receive a service request via the multiple-user interface, the service request comprising input from the plurality of participant user accounts, and submit the service request to a messaging bot. The service request is submitted by the initiating user account as being associated with the initiating user account. The service request is sent to the messaging bot as originating with the initiating user account.

The plurality of participant user accounts may comprise the initiating user account and one or more contributor user accounts other than the initiating user account. The input comprising the service request may comprise a group service configuration from the initiating user account and one or more individual service configurations from the one or more contributor user accounts. For instance, each participating user may indicate a particular portion of the service they'd like to receive. For example, a participating user may select a food order, transportation order, or other service order. As such, the one or more individual service configurations may comprise one or more option selections. Alternatively, the one or more individual service configurations may comprise one or more service-request participation confirmations, such that a participant count for a requested service is determined based on the one or more service-request participation confirmations.

A multiple-user application may be used to generate a service request with an associated cost. In some cases, the messaging component 530 may receive a cost-split request from the initiating user account and send the cost-split request to the one or more contributor user accounts. The cost-split request may be sent via the message queue 580. The cost-split request may be operative to initiate a financial transfer from the one or more contributor user accounts. In some instances, the financial transfer may be used to reimburse the initiating user account. Alternatively, the financial transfer from one or more participant user accounts may be pooled to pay for the requested service.

Figure 7:
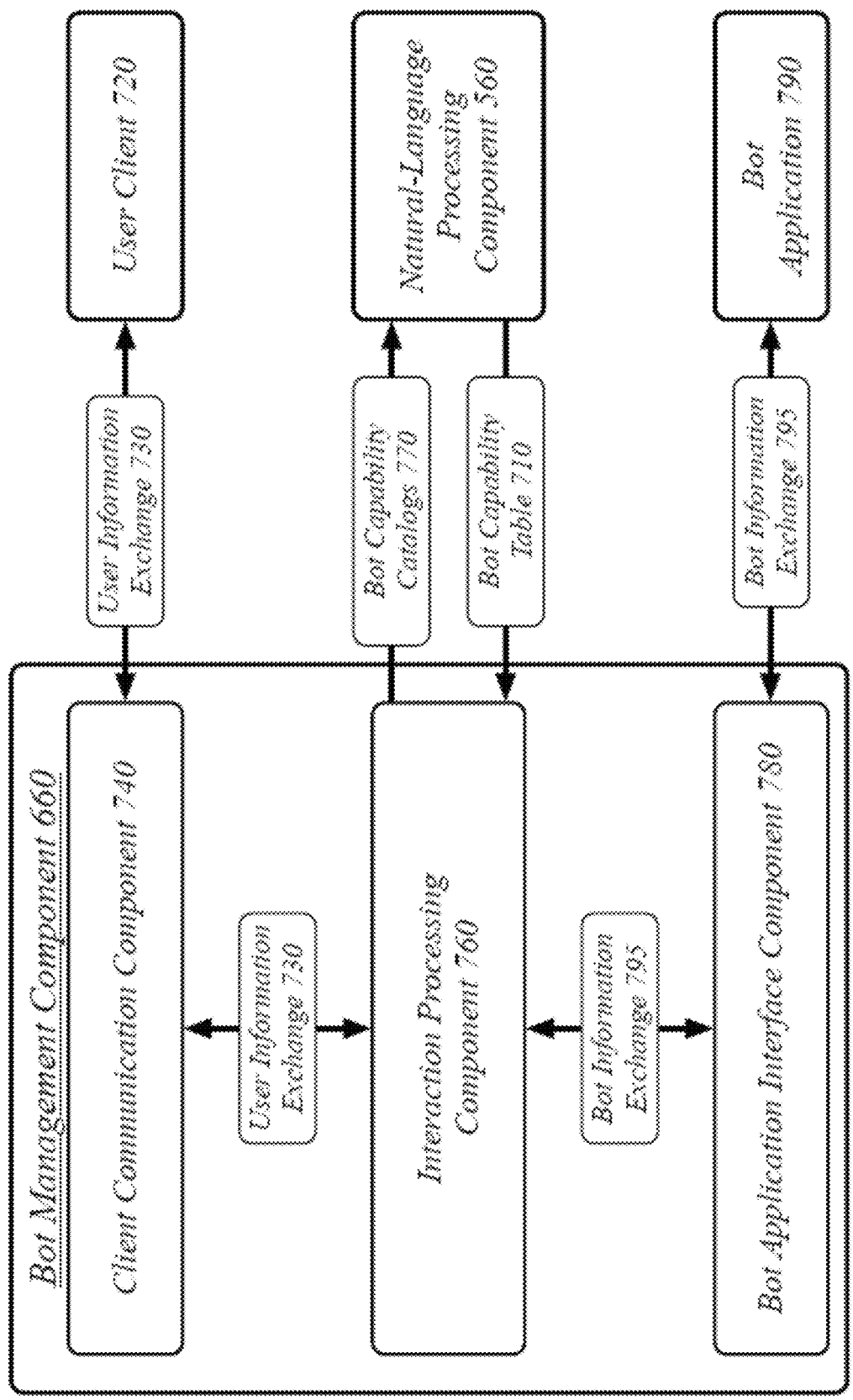
FIG. 7 illustrates an embodiment of a consumer-to-business messaging system determining a messaging bot options configuration based on a user information exchange and a bot information exchange.

FIG. 7 illustrates an embodiment of a consumer-to-business communication system 100 determining a messaging bot options configuration 610 based on a user information exchange 730 and a bot information exchange 795.

The user-to-bot conversation may be mediated by a bot management component 660. The bot management component 660 may be coupled to messaging servers for a messaging system 140. The messaging servers may perform the sending and receiving of messages between the bot management component 660 and the user client 720. The messaging servers may perform the sending and receiving of information between the bot management component 660 and the bot application 790, or a bot-application front-end may be used, such as business portal 160.

A user client 720 may comprise a messaging client, a dedicated client for access to the bot application 790 or a plurality of bot applications for a plurality of bots 190, or any other client including messaging functionality. The user client 720 may execute on the client device. The user client 720 may engage in a user information exchange 730 with the bot management component 660 using a client communication component 740. The client communication component 740 may provide a client front-end to the bot management component 660, which may be mediated by the transmission of messages by a messaging system 140. The user information exchange 730 may comprise the sending of user-composed messages from the user client 720 to the bot management component 660 and the sending of bot messages from the bot management component 660 to the user client 720. The user information exchange 730 may further include additional user information in addition to user messages, such as, without limitation, social-networking information for one or more users, bot interaction history information for one or more users, or other user information.

A bot application 790 may comprise a software program, such as may execute on a developer computer system or may be hosted by the consumer-to-business communication system 100. The bot application 790 may engage in a bot information exchange 795 with the bot management component 660 via a bot application interface component 780. The bot application interface component 780 may act as a front-end to the bot management component 660 and/or messaging system for bot applications. The bot information exchange 795 may comprise the submission of example conversations to the bot management component 660 and the performance of bot API calls by the bot application interface component 780 with the bot application 790. The bot information exchange 795 may comprise the submission of a bot capability catalog to the bot management component 660 and/or other information exchange for the selection of a bot for suggestion to a user.

The bot application interface component 780 receives a plurality of bot capability catalogs 770 for a plurality of bots at a bot-service system. The bot-service system may comprise a component of a messaging system 140. The bot capability catalog for a particular bot application 790 may be received as at least part of a bot information exchange 790 with that bot application 790. The bot application interface component 780 provides the bot capability catalogs 770 to the interaction processing component 760 as part of a bot information exchange 795 for each of the bots.

Each of the plurality of bot capability catalogs 770 expresses bot capability in natural language for an associated bot. A particular bot is built to provide a particular service or set of services. These services may be expressed in natural language, such as English, Spanish, or any other language. These services may use natural language to describe in human-readable terms what service or services the bot may provide to the user. Various human-readable bot capability descriptions may be used. For example, a developer may describe a food-delivery-ordering bot with the sentence "This bot can help find and order food for delivery in the San Francisco area." One or more of the plurality of bot capability catalogs 770 may express bot capability in one or more example user prompts. An example user prompt is an example of a user statement, user interaction, or other user behavior that the developer indicates should prompt an interaction with the bot, such as suggesting the bot to a user. For example, an example user prompt may be the human-readable natural-language sentence, "What do you think about ordering something in?" As illustrated in the example sentence, an example user prompt may comprise a portion of a user-to-user exchange, such that a user may be suggested bots to accompany the natural flow of their conversation with one or more other users.

The bot application interface component 780 may receive one or more bot capability catalogs of the plurality of bot capability catalogs 770 via a developer bot-configuration interface. As such, the natural-language expression of the bot capabilities may be developer-written bot capability descriptions. Further, the developer-written bot capability descriptions may be developer-written example user prompts. In some cases, a developer may receive logs of user interactions with their bot. The developer may then mark a user prompt as an example user prompt that should, moving forward, be used as an example of a user statement that should prompt interaction with the bot. As such, at least some bot capability descriptions may be developer-approved user-generated example user prompts. In some cases, a developer may edit a user-generated prompt before using the user-generated prompt as an example user prompt for the bot.

The client communication component 740 receive a user service prompt from a user client device. A user service prompt is any indication in relation to a user that it may be appropriate to suggest a bot to the user. The user service prompt may be expressed in natural language. This natural language may comprise written text, spoken word, visual gestures or signs (e.g., sign language), or any other use of natural language. In some cases, the user prompt may be received via a messaging client on the user client device. The user prompt may comprise a portion of an interaction between two or more users. This interaction may comprise a messaging interaction performed using a messaging client.

In some cases, the user prompt may comprise a bot interaction result. A bot interaction result is the result of an interaction between one or more users and one or more bots. For example, a user making a restaurant reservation via a bot is a bot interaction result. A bot interaction result may be recognized as a user prompt in order to encourage chains of interactions with bots. For instance, a user may be suggested transportation-service bots in response to a bot interaction result of making an appointment, reservation, or other plan to travel to a particular location. For example, in response to a restaurant reservation being made via a bot, the user may be suggested a ride-sharing bot without any other user action (such as expressing a specific interest in transportation) by the user.

The interaction processing component 760 determines one or more selected bots of the plurality of bots by matching the user service prompt against the plurality of bot capability catalogs 770. In some cases, the consumer-to-business system 100 may be configured to, where possible, suggest multiple bots to provide options to the user. As such, the interaction processing component 760 may determine two or more selected bots of a plurality of bots.

The client communication component 740 then identifies the one or more selected bots to the user client device in response to receiving the user service prompt from the user client device as part of the user information exchange 730. The one or more selected bots may be identified to the same messaging client on the user client device that was used to detect the user prompt.

The interaction processing component 760 may use an NLP component 560 to match natural-language user prompts to natural-language bot capabilities. The interaction processing component 760 submits the plurality of bot capability catalogs 770 to the NLP component 560 and receives a bot capability table 710 from the NLP component 560 in return. The interaction processing component 760 submits the user prompt to the NLP component 560 and receives a user intent from the NLP component 560 in return. The interaction processing component 760 then determines the one or more selected bots by comparing the user intent to the bot capability table.

This comparison may be performed using numerical vectors that represent an inferred meaning of a natural language expression in an abstracted numerical form. The bot capability table 710 may represent the plurality of bot capability catalogs as a plurality of bot capability vectors. The plurality of bot capability vectors encode the natural-language bot capabilities in an abstracted numerical form. In some embodiments, each bot may be represented by a single bot capability vector, such that even a plurality of natural-language bot capability expressions are combined into a single numerical vector. However, in other embodiments, bots may be represented by multiple vectors, such as by having a distinct vector for each of a plurality of bot capability expressions (e.g., a plurality of example user prompts) in the bot capability table 710. The translation from natural-language bot capabilities to non-natural-language bot capability vectors is performed by the NLP component 560 using natural-language-to-vector techniques.

Similarly, the user intent may represent the user prompt as a user intent vector. The translation from a natural-language user prompt to a non-natural-language numerical vector is performed by the NLP component 560 using natural-language-to-vector techniques.

Comparing the user intent to the bot capability table 710 therefore may comprise performing a similarity search of the plurality of bot capability vectors based on the user intent vector. The interaction processing component 760 may search the bot capability table 710 using the vectorized user intent as a search term. The similarity search may be based on a cosine similarity comparison. The bot capability table 710 may be organized to empower efficient cosine similarity comparisons, such that the plurality of bot capability vectors are searched without a direct cosine similarity calculation being performed between all of the plurality of bot capability vectors and the user intent vector. The interaction processing component 760 selects one or more bots based on the similarity search determining that the one or more bot capability vectors for the one or more bots are similar to the user intent vector.

The interaction processing component 760 may select a predefined number of bots by selecting the predefined number of bots with bot capability vectors with the highest similarity to the user intent vector. Alternatively, the interaction processing component 760 may select a selection of bots by selecting those bots with bot capability vectors that exceed a predefined similarity threshold to the user intent vector. These techniques may be used in combination, such as by selecting those bots with bot capability vectors that exceed a predefined similarity threshold to the user intent vector without exceeding the predefined number of bots, such that if more bots exceed the predefined similarity threshold than allowed by the predefined number, the predefined number of bots with the highest similarity to the user intent are selected. As such, the selected bots may be those that exceed the predefined similarity threshold up to the predefined number of bots. The selected bots may be ranked for display on a client device according to the degree of similarity, with higher-similarity bots ranked higher than lower-similarity bots.

In some embodiments, the selected bots may be filtered based on user-specific information to improve the selection and ranking of bots for a specific user. As such, the interaction processing component 760 may determine two or more filtered bots of the two or more selected bots based on bot relevancy and identify the two or more filtered bots to the user client device in response to receiving the user service prompt from the user client device. Bot relevancy corresponds to the predicted relevancy of a particular bot to a particular user. Filtering the selected bots for bot relevancy to a particular user, or to the plurality of users in a message thread, addresses the particular preferences of a user or users so as to improve the individual experience of the particular users as compared to performing recommendations uniformly across the user base of a consumer-to-business communication system 100.

The interaction processing component 760 determines the bot relevancy for the two or more suggested bots to determine one or more filtered bots. Determining bot relevancy may be based on one or more signals, such as, without limitation, user profile information, user behavior information, user location information, user messaging context information, and user bot history information. The client communication component 740 may retrieve user information for use in analyzing the signals and provide the user information as part of the user information exchange 730.

User profile information may include a variety of different types of information. User profile information may include demographic information. User profile information may include relationship information. User profile information may include education and/or occupational information. User profile information may include preference information, such as user-generated information indicating a user's favorite media, services, or other preferences. As such, the user profile information may include user service preference information in the user profile for a user.

Bots may be empowered to provide bot ranking information relevant to ranking the bots to the consumer-to-business communication system 100 to aid the consumer-to-business communication system 100 in ranking the bots. A bot may be provided with information describing a user service prompt and/or the one or more users prompting an offer of one or more bots. The bot is allowed to analyze this information and provide bot ranking information indicating its own analysis of whether it is appropriate for responding to the user service prompt and/or providing service to the one or more users. The bot may be encouraged to provide an honest and accurate assessment by penalizing bots that provide bot ranking information indicating that they should be highly ranked, but who are then poorly received by users. In general, the bot may be encouraged to provide an honest and accurate assessment by rewarding bots that provide bot ranking information that positively corresponds to user reception of the bot and by punishing bots that provide bot ranking information that poorly corresponds to user reception of the bot. User reception of the bot may comprise one or more measures of user response to a suggested bot, such as, without limitation, a bot being selected for use, a user using a bot to receive a service, and user satisfaction with a service received from a bot or some other element of a bot experience.

The interaction processing component 760 queries the two or more filtered bots for bot ranking information and ranks the two or more filtered bots based on the bot ranking information. The ranking of the filtered bots may determine which of the filtered bots are displayed for one or more users and/or the order in which the one or more filtered bots are displayed for the one or more users. The ranking bot information may contribute to the determination of a ranking order for the filtered bots. A highest-ranked groups of filtered bots may be provided to one or more client devices for display and ordered for display based on the ranking order of the provided filtered bots. The bot ranking information may comprise at least a portion of the bot information exchange 795. The bot ranking information may comprise a numerical score generated by the bots, with the numerical score contributing to a ranking number for each bot through a mathematical combination of multiple factors including the numerical score.

In some cases, a bot may be provided with user information for a user to aid it in generating the bot ranking information. Querying the two or more filtered bots for the bot ranking information may comprise providing user information for a user account, where the user service prompt is associated with the user account for the bot-service system. The user information may comprise user profile information, such as may include demographic information and user-interest information. The user information may comprise user-service-preference information. The user information may include location information, which may be particularly of use for bots that relate to service that include a physical component, such as for food delivery or transportation.

User information is kept secure by the consumer-to-business communication system 100 and, as such, permission from a user to share user information may be required before the information is shared. As such, the interaction processing component 760 may determine a user-information share setting for a bot of the two or more filtered bots and request a user-information share permission from the user account based on the user-information share setting and the determining of the bot as a filtered bot. A user-information share permission is a permission for user information associated the user account to be shared with third parties. Such a permission may be required before information is shared with third parties. In some embodiments, permission to share information with third parties may be asked and received for all bots using the consumer-to-business communication system 100, such that permission is granted to share certain information in general when determining suggested bots. Alternatively, in some embodiments, permission to share information with third parties may be asked and received for a specific bot, such that permission to share user information is requested from the user for that specific bot and a received permission is only for that specific bot. As such, in these embodiments, a user may be asked for further permission to share information with other bots.

In one case, the filtered bots may include an account-based bot. An account-based bot is a bot where use of the bot to receive a service uses a user account in addition to the user account used for the consumer-to-business communication system 100. For example, the user may have a messaging account for a messaging system 140 and then a distinct user account for use with a ride-sharing bot. While these accounts may be linked to each other to ease use of the service with the consumer-to-business communication system 100, they represent distinct registrations of the user with distinct systems. In this case, the user information provided to the account-based bot may comprise account information for the account-based bot, such as account information for a service associated with the account-based bot. For example, a ride-sharing bot associated with a ride-sharing service, such as may also be represented by a ride-sharing application on a user client device.

The bot-service system may be operative to chain user interactions with agents such that one interaction with an agent produces additional suggestions that can lead into an additional agent, with this pattern potentially continuing indefinitely. An agent may comprise any entity operative to interact with a message thread in service of the participants in the message thread. Agents may comprise one or more of one or more messaging bots, one or more multiple-user applications, one or more messaging client tools, and one or more social-networking tools. A messaging client tool may comprise a messaging client feature operative to provide a service to a message thread based on user input and producing a result for the message thread. A social-networking tool may comprise a messaging client feature operative to provide a service based on social-networking information and/or generating social-networking information for a message thread.

An agent may comprise a multiple-user poll tool. A multiple-user poll tool may provide a pool on multiple client devices that collects a selection from the client devices and provides a group selection based on the individual selections from the client devices in the message thread. A multiple-user poll comprises a plurality of options. In some cases, the options of a multiple-user poll tool may be configured by a primary user, with the primary user and one or more secondary users—collectively comprising the participants in a message thread—then voting on those options, with the result of the multiple-user pool comprising the majority or plurality selection from among the options. In some embodiments, the consumer-to-business communication system 100 may configure the one or more options automatically. The automatic configuration of options may be based on one or both of messaging interaction information and bot information from a messaging bot. Bot information from a messaging bot may comprise messaging bot configuration options. Messaging bot configuration options may comprise options available for configuring a messaging bot for the configuration of a service to be provided by the messaging bot.

Chaining user interactions with agents may be based on the agents subscribing to particular events. Events include, but are not limited to, a result being produced from an interaction with a message thread. The interaction processing component 760 may receive a plurality of agent-event subscriptions for a plurality of agents at a bot-service system as part of a bot information exchange 795. An agent is subscribed to one or more events as part of the configuration of the agent for use with the consumer-to-business communication system 100. For instance, a messaging bot may be subscribed to various events as part of a developer configuration of the messaging bot.

The interaction processing component 760 detects an event associated with a user account. This user account associated with a user client device. The interaction processing component 760 matches the event against the plurality of agent-event subscriptions to determine one or more event-response agents and identifies the one or more event-response agents to the user client device in response to detecting the event. The event-response agents may be identified to the user client device as a plurality of suggested agents available for selection by the user.

An event may comprise one or more of a user service prompt, a social-information update for the user account, and a user context change for the user account. A user service prompt may comprise a detected interest in engaging in an agent-based service in an interaction between two or more users. A social-information update may comprise, without limitation, one of a relationship status change and a friend addition. A user context change may comprise, without limitation, a user location change. An event may comprise a bot interaction result. A user location change may correspond to a arriving on a particular city block, arriving in a particular city, or any other user location change.

The event may be detected based on a portion of an interaction between two or more users. For instance, the consumer-to-business communication system 100 may perform a multiple-user poll tool, receive a multiple-user poll result from the multiple-user poll toll, and generate a subsequent event for the interaction based on the multiple-user poll result. A subsequent event may be matched against the plurality of agent-event subscriptions to determine one or more additional event-response agents. These additional event-response agents may then be identified to the user client device in response to detecting the subsequent event. The event may be detected according to event information. The event information may be received via a messaging client on the user client device, with the one or more event-response agents identified to the messaging client on the user client device. Event information may comprise, for example, planned attendance at a particular location for a particular event.

An NLP component 560 may comprise a natural-language machine-learning component, such that the NLP component 560 is operative to improve its performance using machine-learning techniques. The interaction processing component 760 may therefore teach the natural-language machine-learning component based on a bot interaction history for the bot-service system.

In some embodiments, a taxonomy may be used for an initial period of a bot-service system and then replaced with a machine-learning based matching between bot capabilities and service prompts. A taxonomy may comprise a human-generated taxonomy that represents bot capabilities according to a defined taxonomy, with the interaction processing component 760 matching user prompts against the bot capabilities based on the defined taxonomy using techniques for defined taxonomies. The interaction processing component 760 may perform a plurality of taxonomy-based bot selections for the bot-service system to generate at least a portion of the bot interaction history.

The consumer-to-business communication system 100 may iteratively improve its performance by using machine learning based on its ongoing experience with suggestions bots to users. The bot application interface component 780 receives a plurality of bot capability catalogs for a plurality of bots at the bot-service system. Each of the plurality of bot capability catalogs expresses bot capability in natural language for an associated bot. The client communication component 740 receives a plurality of user service prompts from a plurality of user client devices, the plurality of user service prompts expressed in natural language. The interaction processing component 760 determines selected bots of the plurality of bots for each of the plurality of user prompts by matching the plurality of user service prompts against the plurality of bot capability catalogs using a bot capability table 710 generated by a natural-language machine-learning component.

The client communication component 740 provides the selected bots to the plurality of user client device in response to receiving the plurality of user service prompts. The interaction processing component 760 records a bot interaction history based on user interactions with the selected bots and then updates the natural-language machine-learning component based on the bot interaction history. The interaction processing component 760 gathers signals related to the performance of the bots based on the bot interaction history.

The interaction processing component 760 may update the natural-language machine-learning component based on optimizing for bot completion rate. Bot completion rate may correspond to the rate at which users complete an interaction with a bot. An interaction with a bot is completed where the interaction produces a result for the user. Optimizing for bot completion rate may be based on user bot dismissal rates. Optimizing for bot completion rate may be based on maintaining a user bot dismissal rate below a defined bot dismissal threshold. Optimizing for bot completion rate may be based on user-bot-history signals. User-bot-history signals indicate information about the interactions between users and bots. Where the bot capability table represents the plurality of bot capability catalogs as a plurality of bot capability vectors, the interaction processing component 760 may update the natural-language machine-learning component to modify the mapping between the plurality of bot capability catalogs and the plurality of bot capability vectors.

In some embodiments, the interaction processing component 760 may update the natural-language machine-learning component based on increasing bot information sharing. Bots which produce a result but do not share information about the result using formal information-reporting signals to the bot-service system may be penalized by having their rank in the suggested bots lowered. Similar penalization may be performed where a bot receives user information in the configuration of a service but does not provide that user information to the bot-service system. In contrast, bots may be rewarded with higher ranking where they provide information to the bot-service system, such as user information about a user determined during the configuration of a service.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8A illustrates one embodiment of a logic flow 800. The logic flow 800 may be representative of some or all of the operations executed by one or more embodiments described herein.

In the illustrated embodiment shown in FIG. 8A, the logic flow 800 may receive a plurality of bot capability catalogs for a plurality of bots at a bot-service system, wherein each of the plurality of bot capability catalogs expresses bot capability in natural language for an associated bot at block 802.

The logic flow 800 may receive a user service prompt from a user client device, the user service prompt expressed in natural language at block 804.

The logic flow 800 may determine one or more selected bots of the plurality of bots by matching the user service prompt against the plurality of bot capability catalogs at block 806.

The logic flow 800 may identify the one or more selected bots to the user client device in response to receiving the user service prompt from the user client device at block 808.

Figure 8B:
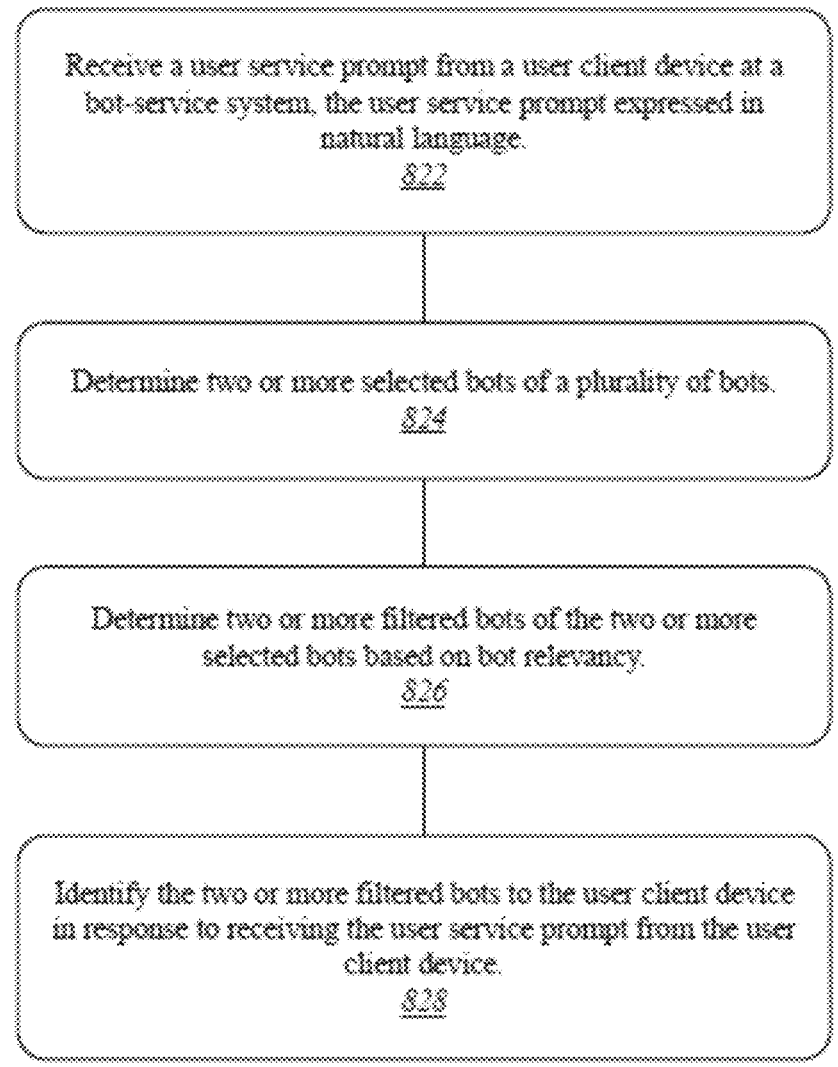
FIG. 8B illustrates an embodiment of a first logic flow for the system of FIG. 1.

FIG. 8B illustrates one embodiment of a logic flow 820. The logic flow 820 may be representative of some or all of the operations executed by one or more embodiments described herein.

In the illustrated embodiment shown in FIG. 8B, the logic flow 820 may receive a user service prompt from a user client device at a bot-service system, the user service prompt expressed in natural language at block 822.

The logic flow 820 may determine two or more selected bots of a plurality of bots at block 824.

The logic flow 820 may determine two or more filtered bots of the two or more selected bots based on bot relevancy at block 826.

The logic flow 820 may identify the two or more filtered bots to the user client device in response to receiving the user service prompt from the user client device at block 828.

Figure 8C:
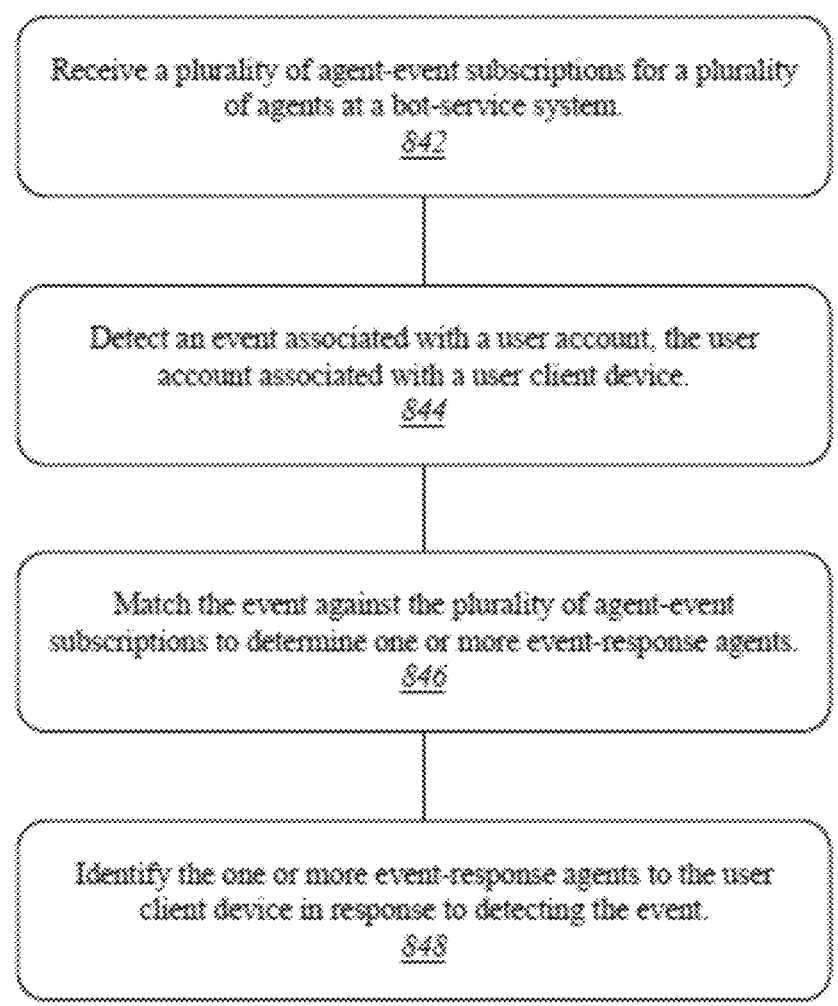
FIG. 8C illustrates an embodiment of a first logic flow for the system of FIG. 1.

FIG. 8C illustrates one embodiment of a logic flow 840. The logic flow 840 may be representative of some or all of the operations executed by one or more embodiments described herein.

In the illustrated embodiment shown in FIG. 8C, the logic flow 840 may receive a plurality of agent-event subscriptions for a plurality of agents at a bot-service system at block 842.

The logic flow 840 may detect an event associated with a user account, the user account associated with a user client device at block 844.

The logic flow 840 may match the event against the plurality of agent-event subscriptions to determine one or more event-response agents at block 846.

The logic flow 840 may identify the one or more event-response agents to the user client device in response to detecting the event at block 848.

FIG. 8D illustrates one embodiment of a logic flow 860. The logic flow 860 may be representative of some or all of the operations executed by one or more embodiments described herein.

In the illustrated embodiment shown in FIG. 8D, the logic flow 860 may receive a plurality of bot capability catalogs for a plurality of bots at a bot-service system, wherein each of the plurality of bot capability catalogs expresses bot capability in natural language for an associated bot at block 862.

The logic flow 860 may receive a plurality of user service prompts from a plurality of user client devices, the plurality of user service prompts expressed in natural language at block 864.

The logic flow 860 may determine selected bots of the plurality of bots for each of the plurality of user prompts by matching the plurality of user service prompts against the plurality of bot capability catalogs using a bot capability table generated by a natural-language machine-learning component at block 866.

The logic flow 860 may provide the selected bots to the plurality of user client device in response to receiving the plurality of user service prompts at block 868.

The logic flow 860 may record a bot interaction history based on user interactions with the selected bots at block 870.

The logic flow 860 may update the natural-language machine-learning component based on the bot interaction history at block 872.

Figure 8E:
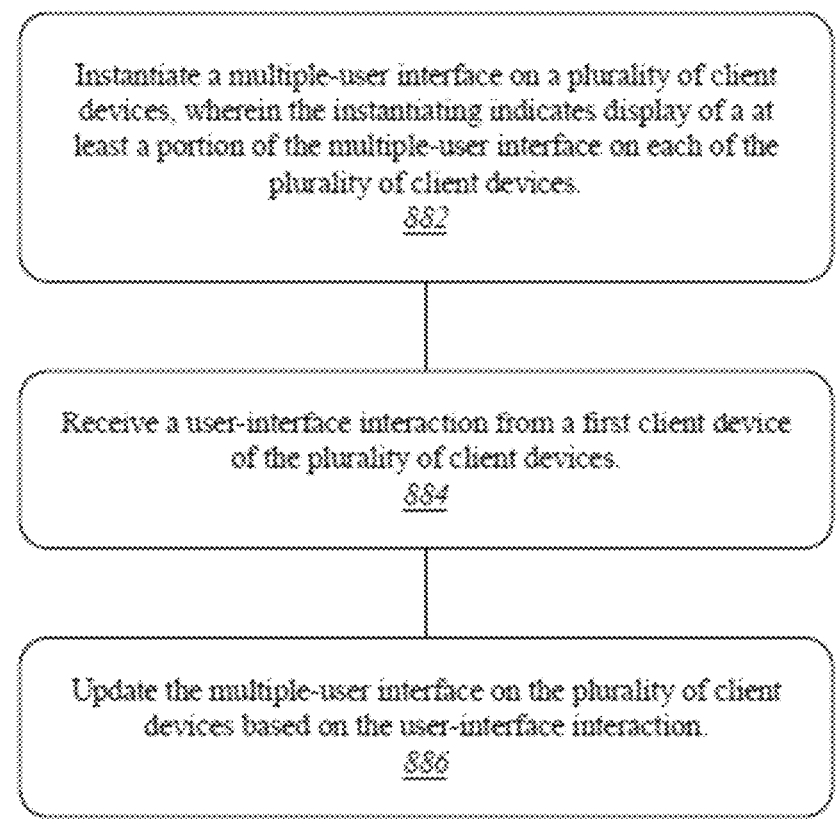
FIG. 8E illustrates an embodiment of a first logic flow for the system of FIG. 1.

FIG. 8E illustrates one embodiment of a logic flow 880. The logic flow 880 may be representative of some or all of the operations executed by one or more embodiments described herein.

In the illustrated embodiment shown in FIG. 8E, the logic flow 880 may instantiate a multiple-user interface on a plurality of client devices, wherein the instantiating indicates display of a at least a portion of the multiple-user interface on each of the plurality of client devices at block 882.

The logic flow 880 may receive a user-interface interaction from a first client device of the plurality of client devices at block 884.

The logic flow 880 may update the multiple-user interface on the plurality of client devices based on the user-interface interaction at block 886.

The embodiments are not limited to these examples.

Figure 9:
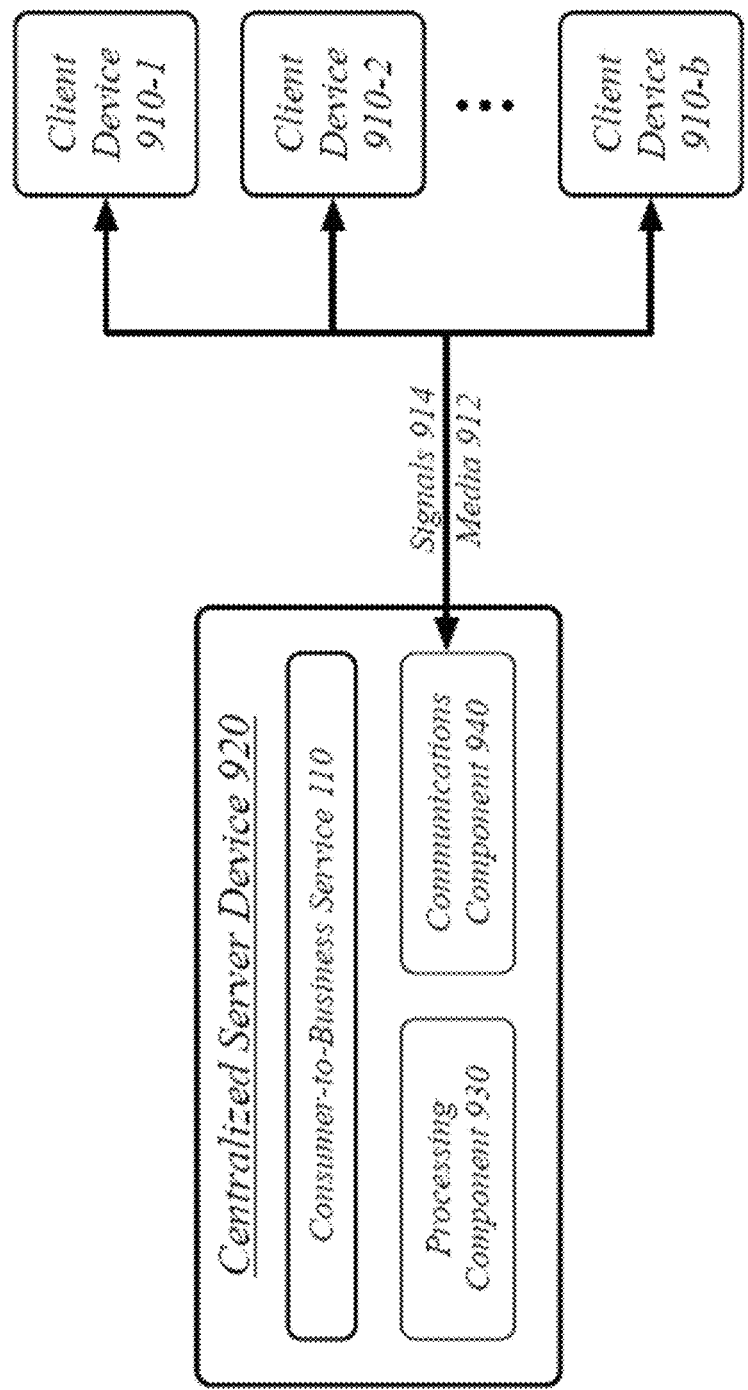
FIG. 9 illustrates an embodiment of a centralized system for the system of FIG. 1.

FIG. 9 illustrates a block diagram of a centralized system 900. The centralized system 900 may implement some or all of the structure and/or operations for the consumer-to-business communication system 100 in a single computing entity, such as entirely within a single centralized server device 920.

The centralized server device 920 may comprise any electronic device capable of receiving, processing, and sending information for the consumer-to-business communication system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 920 may execute processing operations or logic for the consumer-to-business communication system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 920 may execute communications operations or logic for the consumer-to-business communication system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 920 may implement the consumer-to-business service 110 in a single computing entity. The centralized server device 920 may communicate with other devices over a communications media 912 using communications signals 914 via the communications component 940. The devices may be internal or external to the centralized server device 920 as desired for a given implementation. The centralized server device 920 may communicate with a plurality of client devices 910, such as may comprise the client device 120, client device 320, secondary client device 370, sender client device 520, recipient client device 590, or any other client device.

Figure 10:
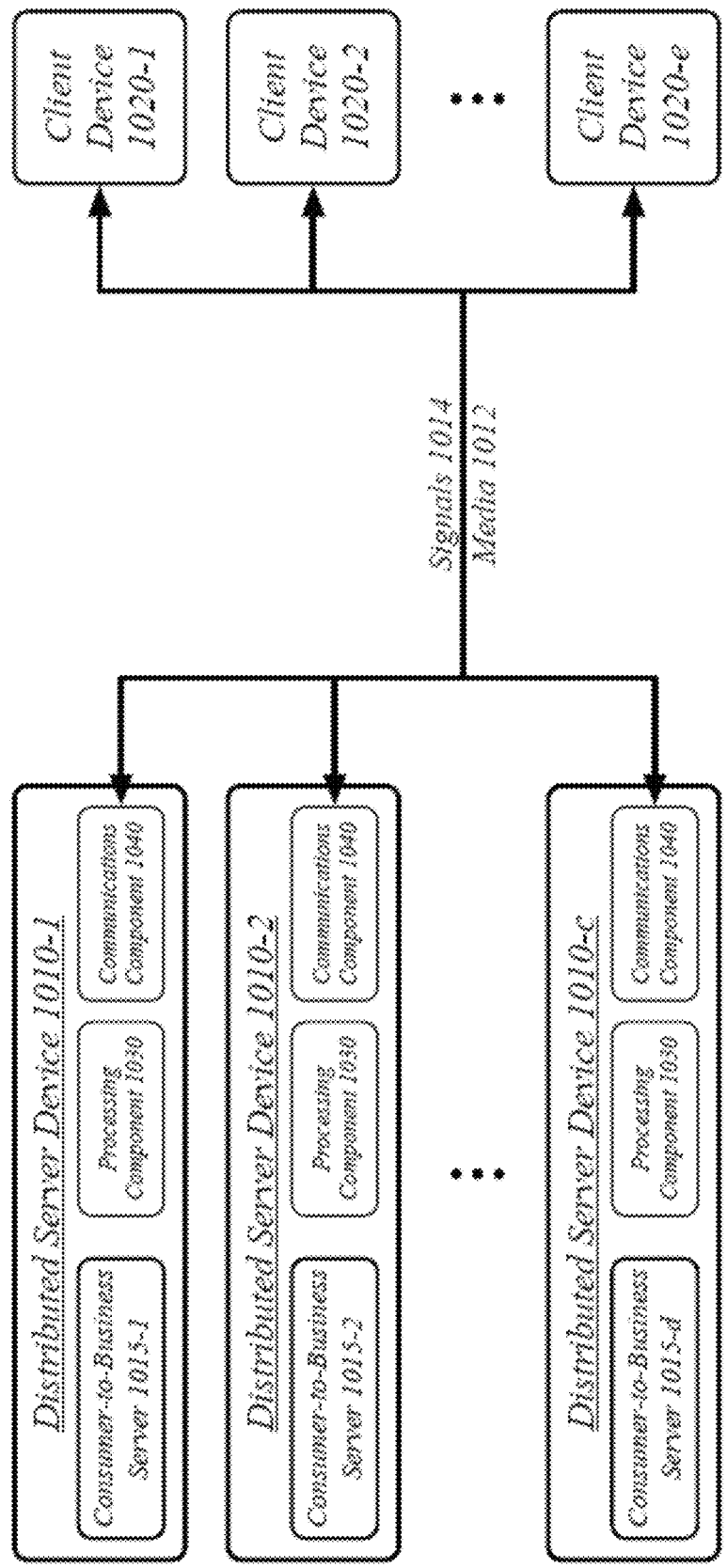
FIG. 10 illustrates an embodiment of a distributed system for the system of FIG. 1.

FIG. 10 illustrates a block diagram of a distributed system 1000. The distributed system 1000 may distribute portions of the structure and/or operations for the consumer-to-business communication system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a plurality of distributed server devices 1010. In general, the distributed server devices 1010 may be the same or similar to the centralized server device 820 as described with reference to FIG. 9. For instance, the distributed server devices 1010 may each comprise a processing component 1030 and a communications component 1040 which are the same or similar to the processing component 930 and the communications component 940, respectively, as described with reference to FIG. 9. In another example, the distributed server devices 1010 may communicate over a communications media 1012 using communications signals 1014 via the communications components 1040.

The distributed server devices 1010 may comprise or employ one or more server programs that operate to perform various methodologies in accordance with the described embodiments. In one embodiment, for example, the distributed server devices 1010 may each implement one or more consumer-to-business servers 1015. The consumer-to-business servers 1015 may collectively implement the consumer-to-business service 110 as a distributed computing entity. The consumer-to-business servers 1015 may communicate with a plurality of client devices 1020, such as may comprise the client device 120, client device 320, secondary client device 370, sender client device 520, recipient client device 590, client device 910, or any other client device.

Figure 11:
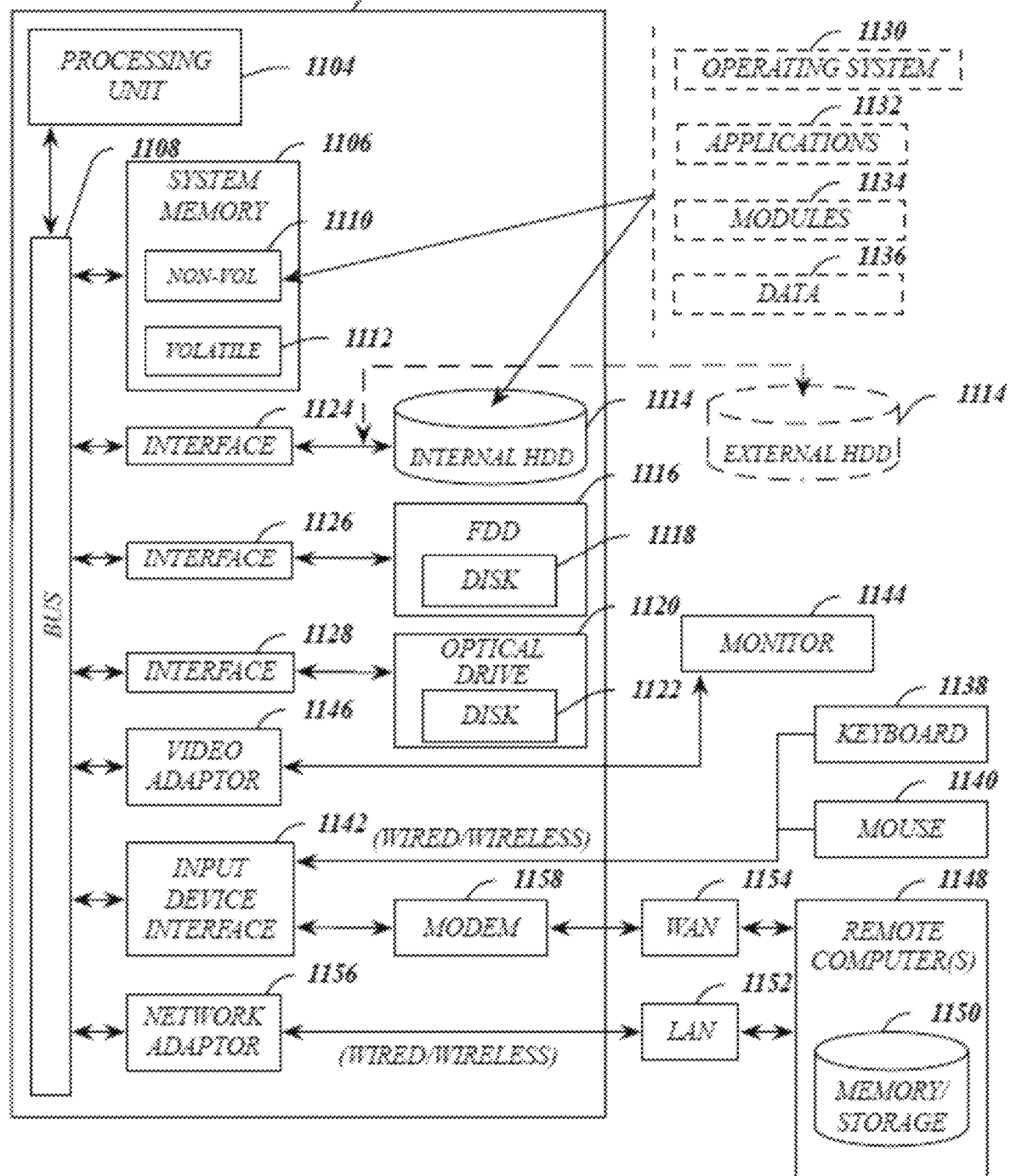
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 9, 10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
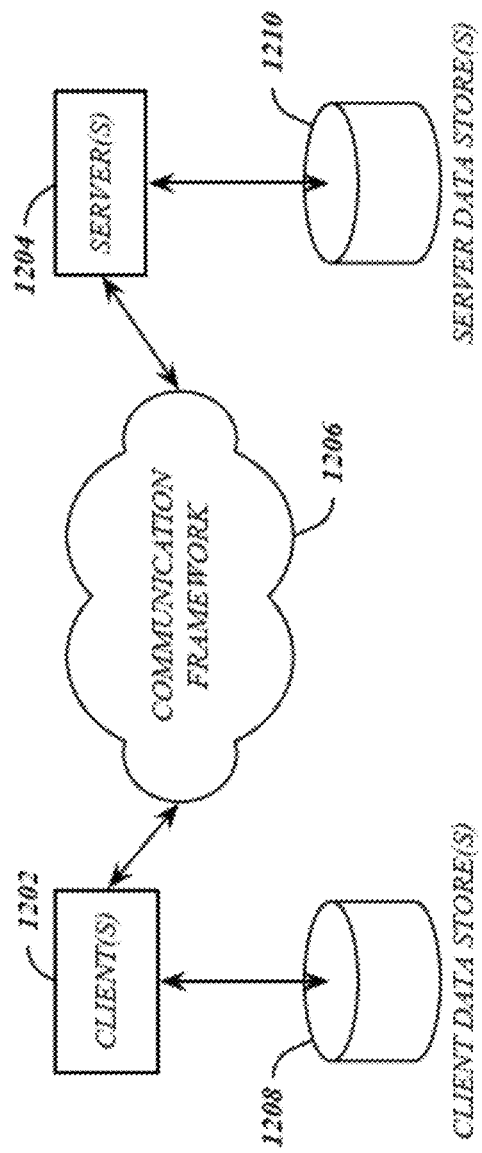
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may correspond to messaging clients or other communication clients. The servers 1204 may implement the servers of the consumer-to-business service 110. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
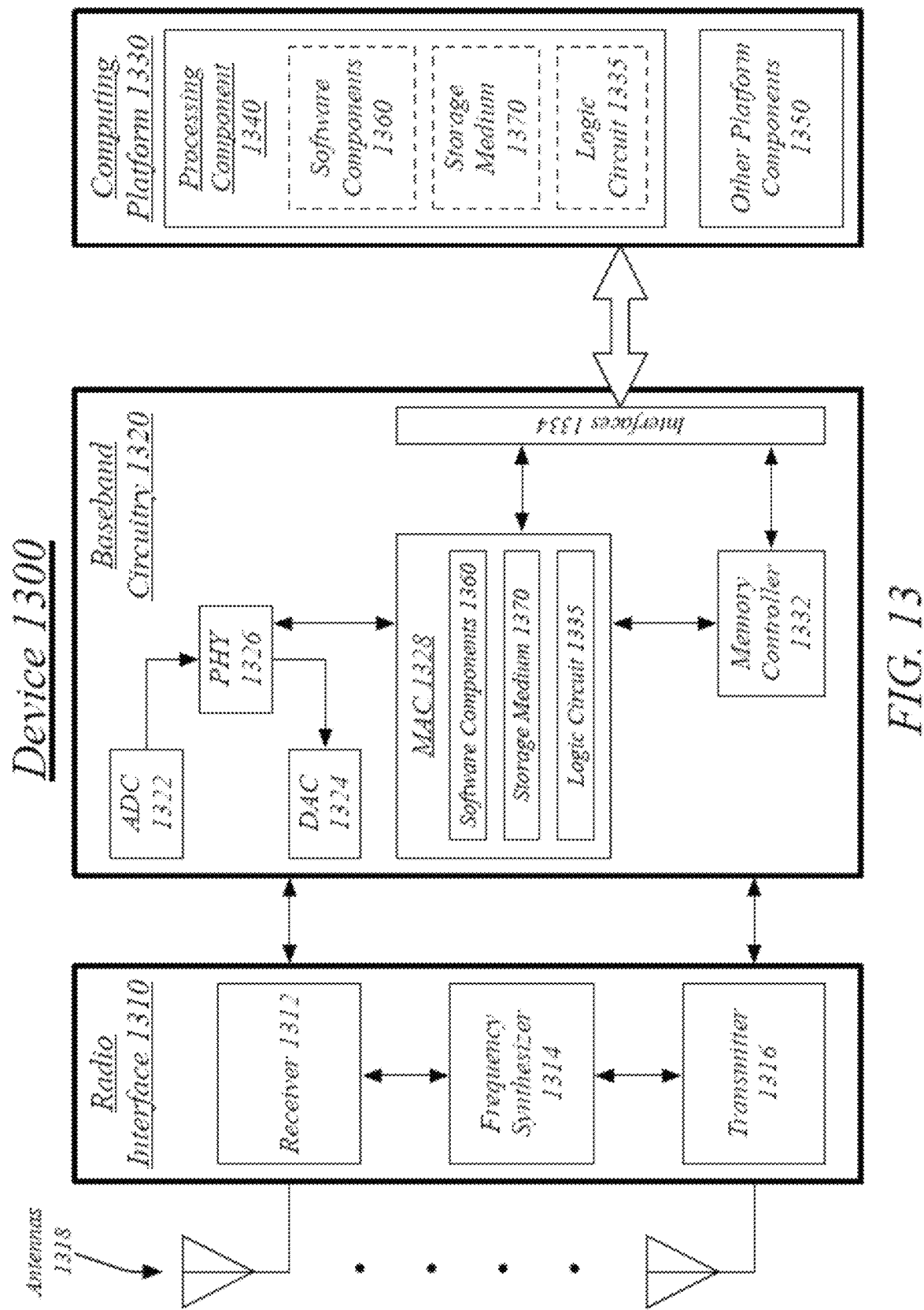
FIG. 13 illustrates an embodiment of a radio device architecture.

FIG. 13 illustrates an embodiment of a device 1300 for use in a multicarrier OFDM system, such as the system 100. Device 1300 may implement, for example, software components 1360 as described with reference to system 100 and/or a logic circuit 1335. The logic circuit 1335 may include physical circuits to perform operations described for the system 100. As shown in FIG. 13, device 1300 may include a radio interface 1310, baseband circuitry 1320, and computing platform 1330, although embodiments are not limited to this configuration.

The device 1300 may implement some or all of the structure and/or operations for the system 100 and/or logic circuit 1335 in a single computing entity, such as entirely within a single device. Alternatively, the device 1300 may distribute portions of the structure and/or operations for the system 100 and/or logic circuit 1335 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for the system 100 and logic circuit 1335 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 1302.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Exemplary Suggestions Mini-Apps

Further embodiments, which may be used separately or in conjunction with the embodiments described above, provide suggestions to group conversation participants so that the participants can use capabilities provided by bots. The suggestions may be provided by the messaging service (e.g., via a messaging application running on an end-user client device or on a server of the messaging service), by the bot provider, or by a third-party provider. The suggestions may include suggestions of bots capable of providing a service requested (explicitly or implicitly) by the conversation participants, and/or may include particular capabilities of a bot.

Figure 14A:
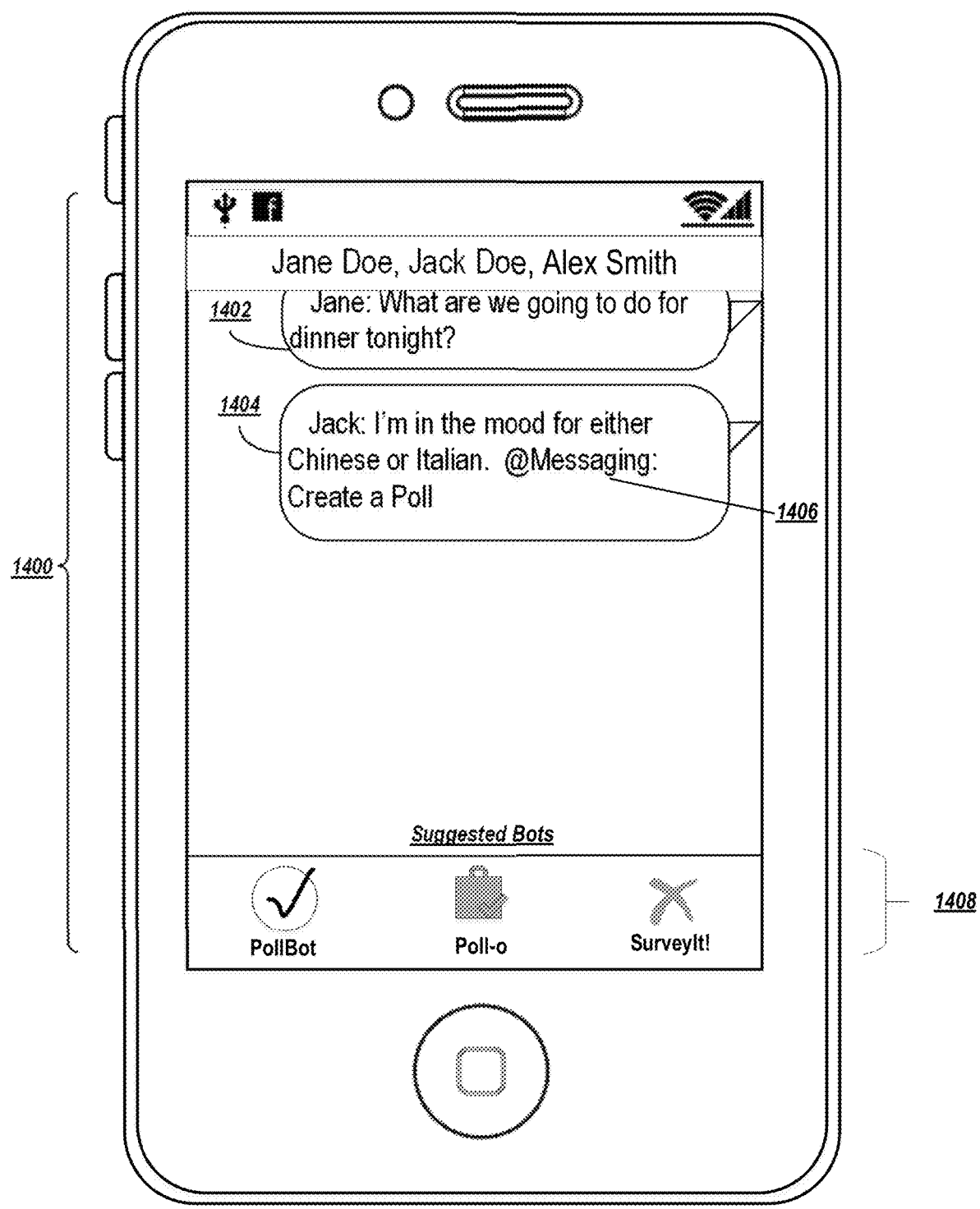
FIG. 14A depicts an exemplary interface for a messaging application in which a participant in a group conversation expressly invokes a suggestions interface.

In some embodiments, these suggestions may be provided reactively, in response to an express invocation of a bot, service, or capability. For example, FIG. 14A depicts an exemplary interface 1400 for a messaging application in which a participant in a group conversation expressly invokes a suggestions interface. In this example, conversation participant Jane sends a first message 1402 into the conversation, asking what time the conversation participants would like to go to dinner. Conversation participant Jack responds with a second message 1404, which includes an invocation 1406 asking the messaging service to "create a poll."

The invocation 1406 may serve as a trigger asking the messaging service to provide suggestions of bots or bot features that can respond to the invocation 1406. The invocation 1406 may be self-contained in a dedicated message or, as shown in FIG. 14A, may be a part of a larger message.

The invocation 1406 may be expressed in natural language, as opposed to traditional invocations that tend to have a specified format and/or predefined commands or keywords. A machine learning (ML) natural language processor (NLP) may process the invocation 1406 and determine an intent of the invocation (e.g., initiating a poll). The intent may come from a predefined list of intents that an ML NLP intent classifier model is trained to recognize. The classifier model may generate outputs for some or all of the intents, where the outputs include respective confidence scores (e.g., expressed as percentages) indicating a confidence that the intent corresponding to the confidence score is the intent reflected in the invocation 1406.

The intent may be compared to a list of predefined intents that are mapped to particular bots capable of serving those intents, and/or the messaging service may look up bots in a bot catalog using the intent as a search term.

The messaging service may select a number n of bots capable of servicing the intent, and display the selected bots in a suggested bots interface element 1408. The number n of selected bots may depend on the size of graphical elements (e.g., icons) associated with the bots, and the available screen real estate (ensuring that the suggested bots interface element 1408 does not become overcrowded). Thus, the number n of selected bots may vary depending on the device and/or device settings (e.g., resolution, orientation, etc.) on which the suggested bots interface element 1408 is displayed. In some embodiments, the suggested bots interface element 1408 may be a horizontally scrolling list, which allows a user to scroll through list items that would otherwise not fit on a single screen.

In some embodiments, selecting one of the bots displayed in the suggested bots interface element 1408 may cause the messaging service to invoke the bot, which adds the bot as a conversation participant and allows the bot to communicate with the members of the group engaging in the conversation. In others, tapping on a suggestion or invoking the bots suggestion system may cause a single, centralized entity to be added to the conversation. The single entity may be capable of interfacing with many different bots to provide the capabilities of the bots in the conversations, although the conversation participants may continue to interact only with the centralized entity.

In some embodiments, the bot may trigger a mini-app in the conversation (see FIGS. 15A, 16A, and 17A) in order to perform initial setup of the bot capabilities. In contrast to a typical message, a mini-app included in a conversation may include interactable elements allowing the bot to be configured for a particular task. This mini-app may be viewed by all participants in the conversation, or only the user who invoked the bot. The mini-app may be dynamic, and hence its appearance may change over time. For example, a bot may send a message into a conversation with a mini-app that allows a poll to be set up (see FIG. 15A). After the poll is configured, the appearance of the mini-app may change to display the poll in the same message or a replacement message taking the same location in the conversation as the original message (FIG. 15B).

The n bots selected for display in the suggested bots interface element 1408 may be the top n bots in a ranked list of bots capable of servicing the intent. The bots may be ranked based on a ranking score which may account for (e.g.) how well the bot is able to service the intent, user preferences (such as whether the user has used the bot before, or a bot from the same provider), bot popularity etc. The n selected bots may be displayed in a ranked order in the suggested bots interface element 1408.

The ranking score may be different for the different participants in the conversation. Accordingly, different bots may be displayed in the suggested bots interface element 1408 on different user devices.

In some embodiments, the suggested bots interface element 1408 is not displayed. Instead, the top bot may be selected and automatically invoked by the messaging service. The decision as to whether to make suggestions or to simply invoke the bot outright may depend on the identified intent, the nature of the bot, and/or user preferences. For example, if the intent indicates a desire to create a poll, and the user has never created a poll before, options may be presented in the suggested bots interface element 1408. On the other hand, if the intent indicates a desire to add a graphical element (such as a sticker or emoticon) to a message, a corresponding stickers bot may be automatically invoked to provide the user with this option.

Figure 14B:
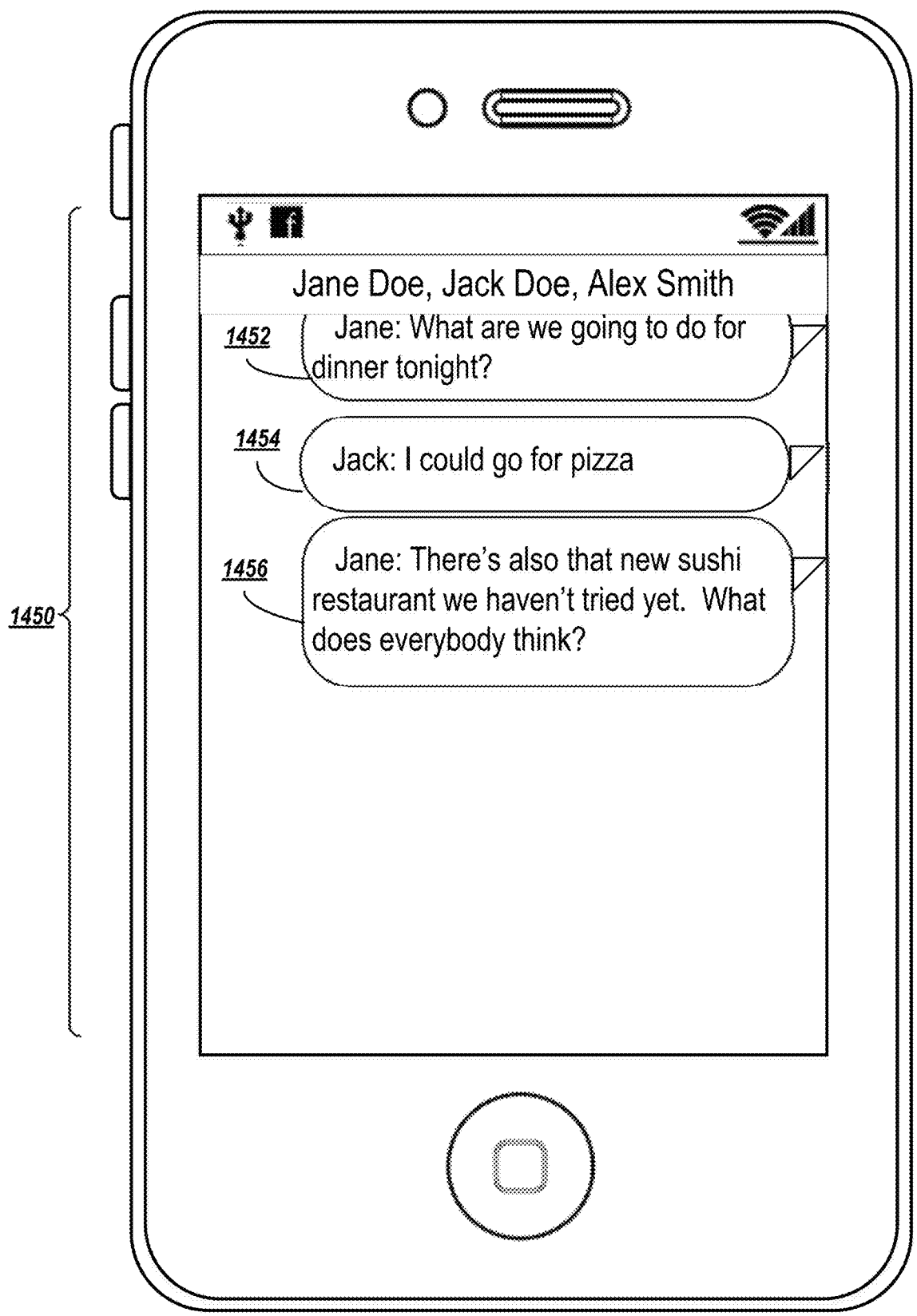
FIG. 14B depicts an exemplary interface for a messaging application in which the messaging service proactively offers a suggestion without an express invocation.

As an alternative or addition to the reactive capabilities described above, the messaging system may proactively offer bot suggestions. FIG. 14B depicts an exemplary interface 1450 for a messaging application in which the messaging service proactively offers a suggestion without an express invocation.

In this conversation, participants Jack and Jane have exchanged three messages 1452, 1454, 1456. None of the messages 1452, 1454, 1456 includes an express invocation of the bot capabilities. Nonetheless, the messaging service may dynamically analyze the messages 1452, 1454, 1456 (alone or together) using a natural language processor to determine an intent of the messages (much like the intent determination that was done for the reactive scenario).

Because the system is not responding to an express invocation, in some embodiments the system may not act unless the intent to invoke the suggestion capability is relatively clear. For example, when generating confidence scores for the intents as discussed above, the system may refrain from invoking the suggestions capabilities unless the highest confidence score exceeds a predefined threshold value (e.g., 60%). The predefined threshold value may be tuned by administrators of the messaging service and/or the conversation participants in order to make the system more or less likely to offer proactive suggestions.

If the confidence score exceeds the predetermined threshold, the suggested bots interface element 1408 may be displayed, or a particular bot may be automatically invoked, as discussed above.

In either the proactive scenario or the reactive scenario, conversation context may be considered when performing the initial invocation of the bot. For instance (as will be described in more detail in the examples below), information from the conversation's messages may be propagated to the bot to specify input parameters. Moreover, meta-information about the conversation (e.g., the location of the conversation participants as the participants may have shared with the system such as through their user profiles, participant preferences, etc.) may also be used to initialize the bot and specify options for input parameters.

These suggestions capabilities may be used for suggesting bots capable of serving any predefined intent. A few examples of such intents and bots are illustrated with respect to FIGS. 15A-17B.

Figure 15A:
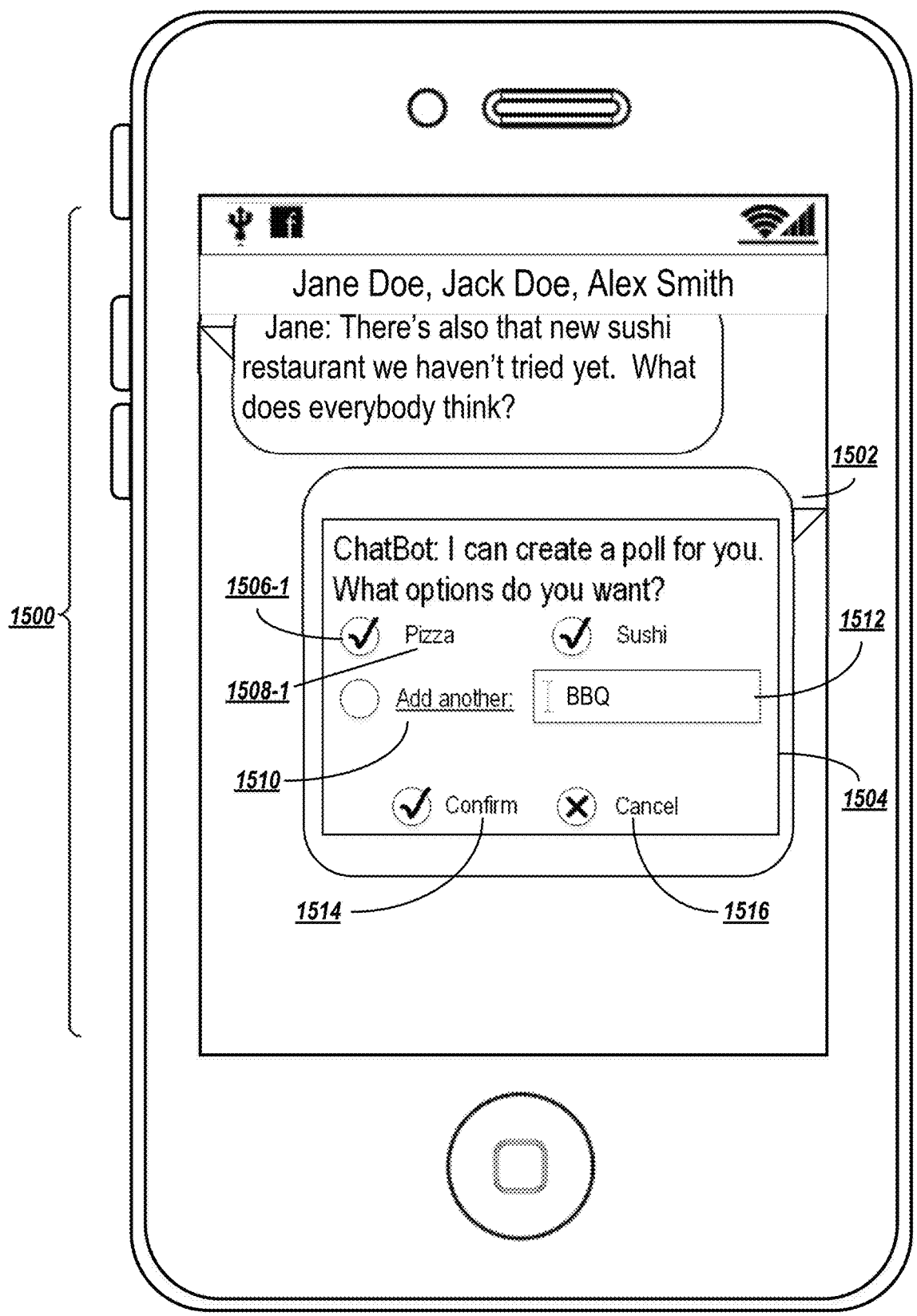
FIG. 15A depicts an example of a polling mini-app presented in a messaging interface.
Figure 15B:
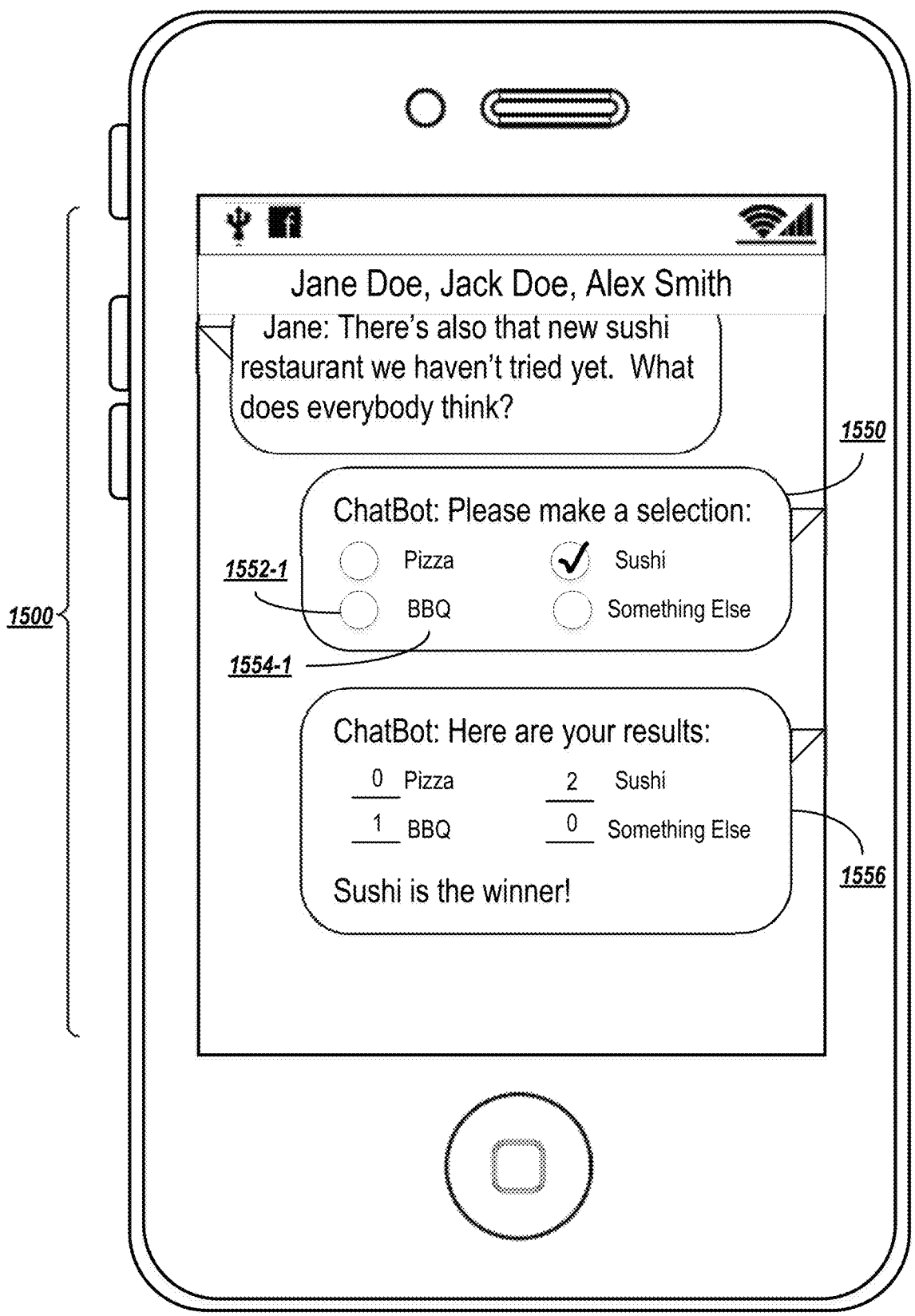
FIG. 15B depicts an example of a poll added to a conversation based on the polling mini-app.

FIG. 15A depicts an example of a polling mini-app presented in a messaging interface 1500. In this example, a message from Jane has caused the messaging system to proactively invoke the bot suggestion capability. A chatbot associated with the messaging system sends a message 1502 into the group conversation. In some embodiments, the message 1502 may be visible to all conversation participants; in others, the message 1502 may be visible to only a subset of users, such as the user whose message triggered the invocation of the suggestion capability (e.g., Jane in this example) or multiple users whose messages contributed to the determination that a proactive suggestion should be offered. In this example, the system has determined that the users' intent was to start a poll, selected the highest-ranked polling bot in the bot catalog, and automatically invoked the bot. In other embodiments, a similar scenario might cause the suggested bots interface element to be displayed.

The message 1502 may include a mini-app 1504 that allows the poll settings to be configured. Although the mini-app 1504 in FIG. 15A is illustrated with a border in the message 1502, this is not necessary. The mini-app 1504 may appear as a normal part of the message 1502 (e.g., without distinguishing marks such as a border). Nonetheless, the mini-app 1504 may differ from other parts of the message in that users can interact with the mini-app 1504

Alternatively or in addition, the mini-app 1504 may appear in the conversation separately from any message 1502. When the user configures the mini-app 1504, the mini-app 1504 may disappear from the conversation, and the corresponding bot may use the provided information to send a message into the conversation (or to update the mini-app 1504, or to cause a different mini-app 1504 to appear).

A polling bot may need to know which options to include in the poll. Traditionally, this might be done by specifying the options as part of an invocation of the polling bot (e.g., "@PollBot startpoll: pizza; sushi; BBQ"). According to exemplary embodiments, however, some or all of the options may be retrieved from the messages of the conversation. For example, the conversation shown in FIG. 15A is a continuation of the conversation in FIG. 15B. The natural language processor may evaluate the messages of the conversation to identify options consistent with the intent. In this example, the users intended to create a poll, and mentioned several food options that could be suitable for use in the poll (pizza and sushi). Accordingly, the polling bot propagates initial options 1508-$i$ for the poll including "pizza" and "sushi."

These initial options may be changed, and more options may be added, through the mini-app 1504. For example, selection elements 1506-$i$ may be associated with each of the options 1508-$i$. By unchecking the selection elements 1506-$i$, the user can exclude some of the suggested options from the poll. Moreover, an addition element 1510 allows a user to specify (e.g. in a input interface 1512 configured to receive an input representing a new option), additional options to be included in the poll. As additional elements are added via the addition element, corresponding options 1508-$i$ and selection elements 1506-$i$ may be added in the mini-app 1504.

The mini-app 1504 may further include a confirmation element 1514 and a cancelation element 1516. By selecting the cancelation element, the user can cancel the invocation of the bot and cause the mini-app 1504 to be closed. By selecting the confirmation element 1514, the user can trigger the bot to send a poll with the specified options into the conversation, as shown in FIG. 15B.

As can be seen in FIG. 15B, the mini-app 1504 from FIG. 15A has been replaced by a poll in a message 1550. In some embodiments, this poll may be included in the same message 1502 that the mini-app 1504 was provided in, and the mini-app 1504 may be updated with an interactable poll. In others, a new message may be sent into the conversation. In still others, the poll may appear in a mini-app separate from any conversation messages.

The poll may include a number of options 1554-$i$ and corresponding selectable elements 1552-$i$. Each member of the conversation may view their own version of the poll message 1550, and may make a selection within the mini-app of the message 1550.

In some embodiments, the poll may be associated with a timer; after the timer expires, any selections in the poll message 1550 may be taken as final and the results of the poll may be tabulated and displayed in a poll results message 1556. In some embodiments, users may change their minds and alter their selection in the poll message 1550, even after the poll results are tabulated. The poll results message 1556 may be updated with the new results. In some embodiments, the poll results 1556 may be displayed immediately or in conjunction with the poll message 1550, and the results may be updated each time a user makes a selection in the poll message 1550.

Figure 16A:
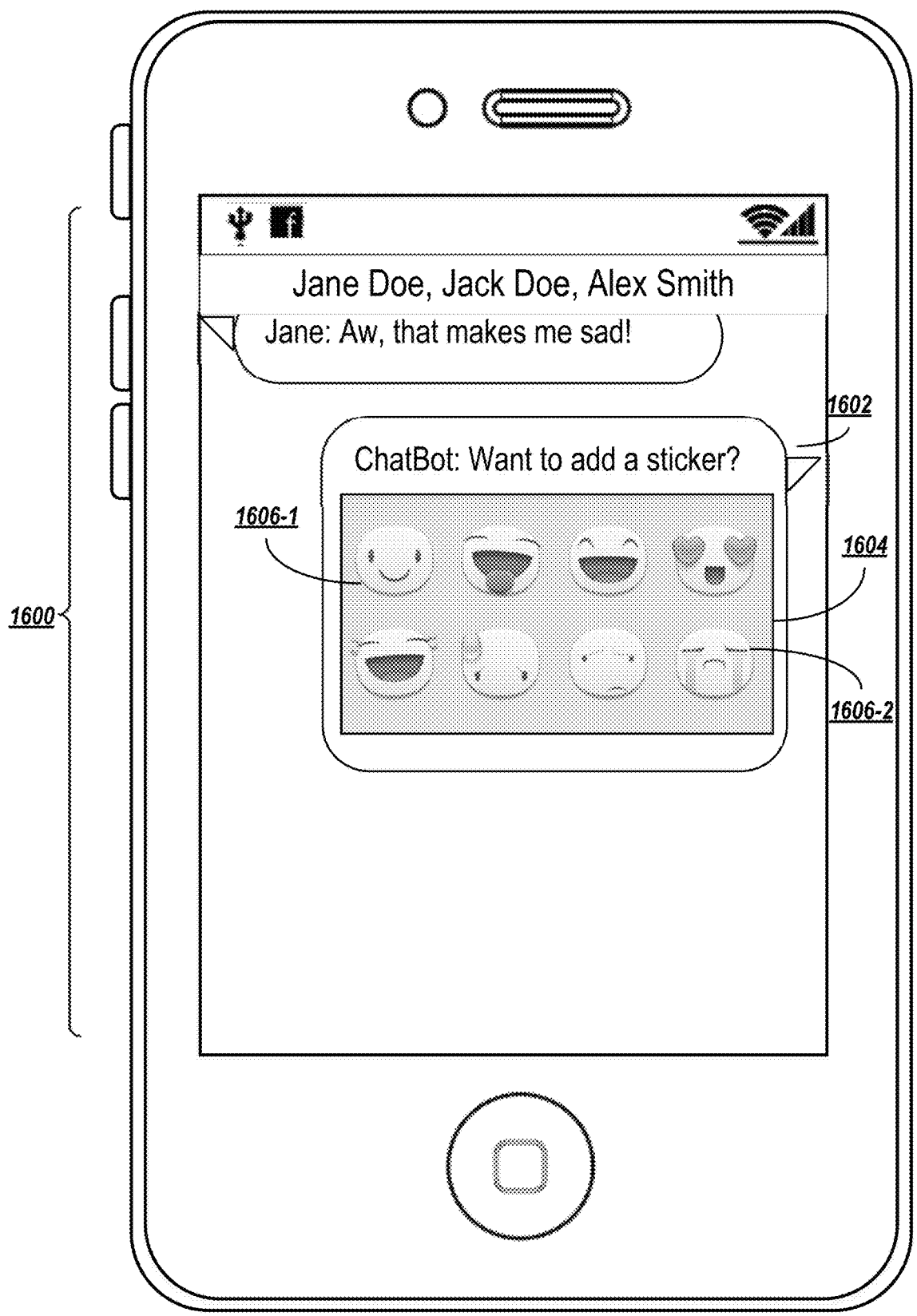
FIG. 16A depicts an example of a stickers mini-app presented in a messaging interface.

FIG. 16A is an example of another type of suggestion, where a stickers mini-app 1604 is presented in a message 1602 of a messaging interface 1600. The stickers mini-app 1604 may provide a user with various graphical elements 1606-$i$ (e.g., stickers, images, emoticons, animated GIFs, etc.) that can be added to a message by the user in the conversation. The stickers mini-app 1604 may be provided by a bot, or may be provided directly by the messaging service.

In this example, the sticker bot 1604 may be triggered by the natural language processor detecting that the character has expressed an emotion that could be represented by a graphical element. In such embodiments, the stickers maintained by the stickers bot may each be associated with particular emotions, and when an emotion corresponding to one of the stickers is detected in the messaging conversation, the stickers bot may be invoked. In other examples, the stickers bot may provide graphical elements corresponding to concepts like "agreement" (such as a thumbs-up icon), animals, locations, or other ideas. When such an idea is detected in the conversation by the natural language processor, the suggestion capabilities of the messaging system may be triggered and may invoke the stickers bot.

The stickers mini-app 1604 may be visible only to the user whose emotion triggered the suggestion capability, or may be provided to multiple users (e.g., all the participants in the conversation). This may allow the other participants to react to the original user's emotion with graphical responses of their own.

Figure 16B:
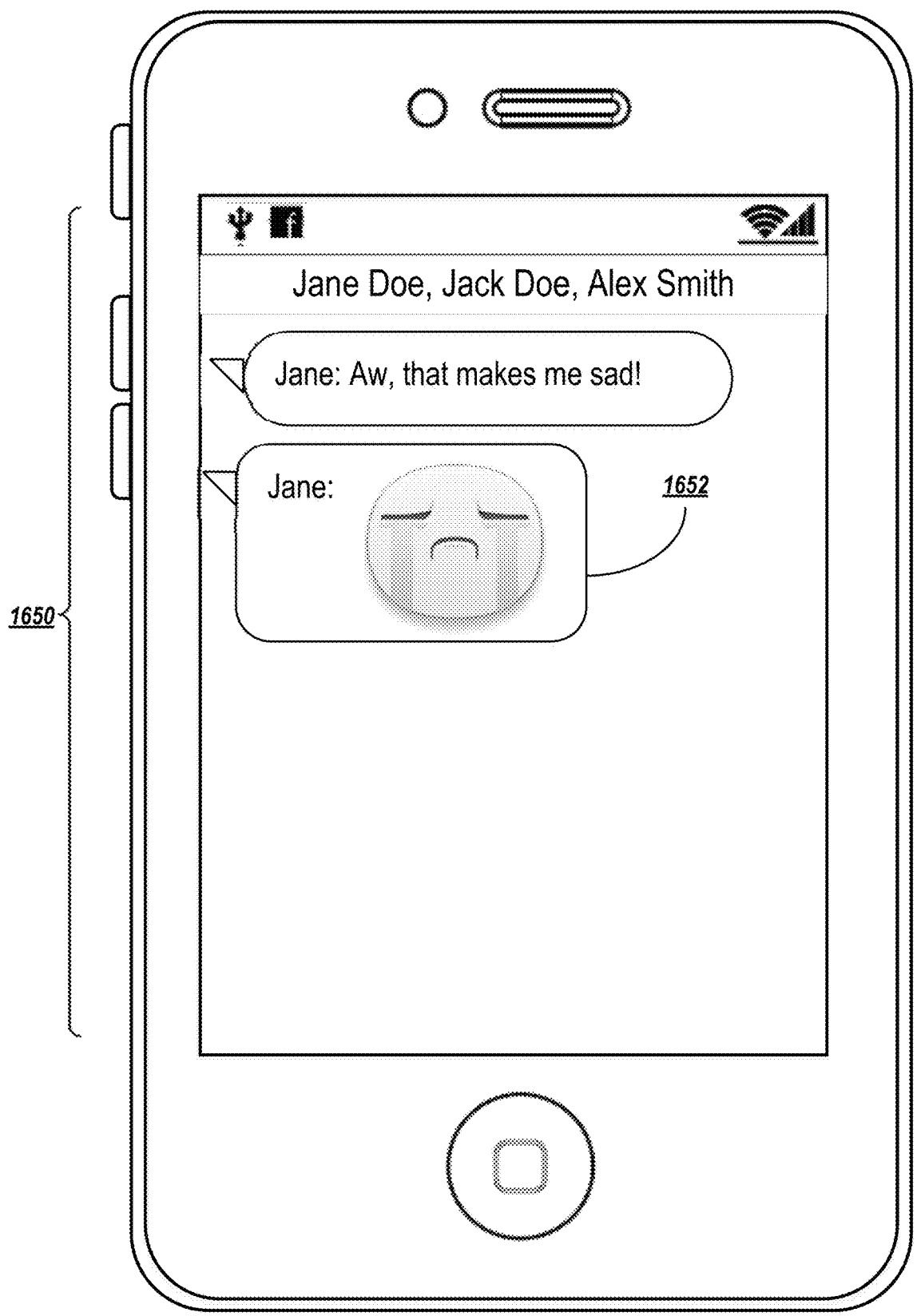
FIG. 16B depicts an example of a sticker added to a conversation based on the stickers mini-app.

Upon selecting one of the graphical elements 1602-$i$, the graphical element may be added to the conversation, as shown in the exemplary interface 1650 in FIG. 16B. In this example, the user Jane has selected the "sad face" element 1602-2, and in response the sticker bot has instructed the messaging service to create a new message 1652 on Jane's behalf. The new message 1652 includes a graphical element corresponding to the one selected via the sticker bot in FIG. 15A.

Figure 17A:
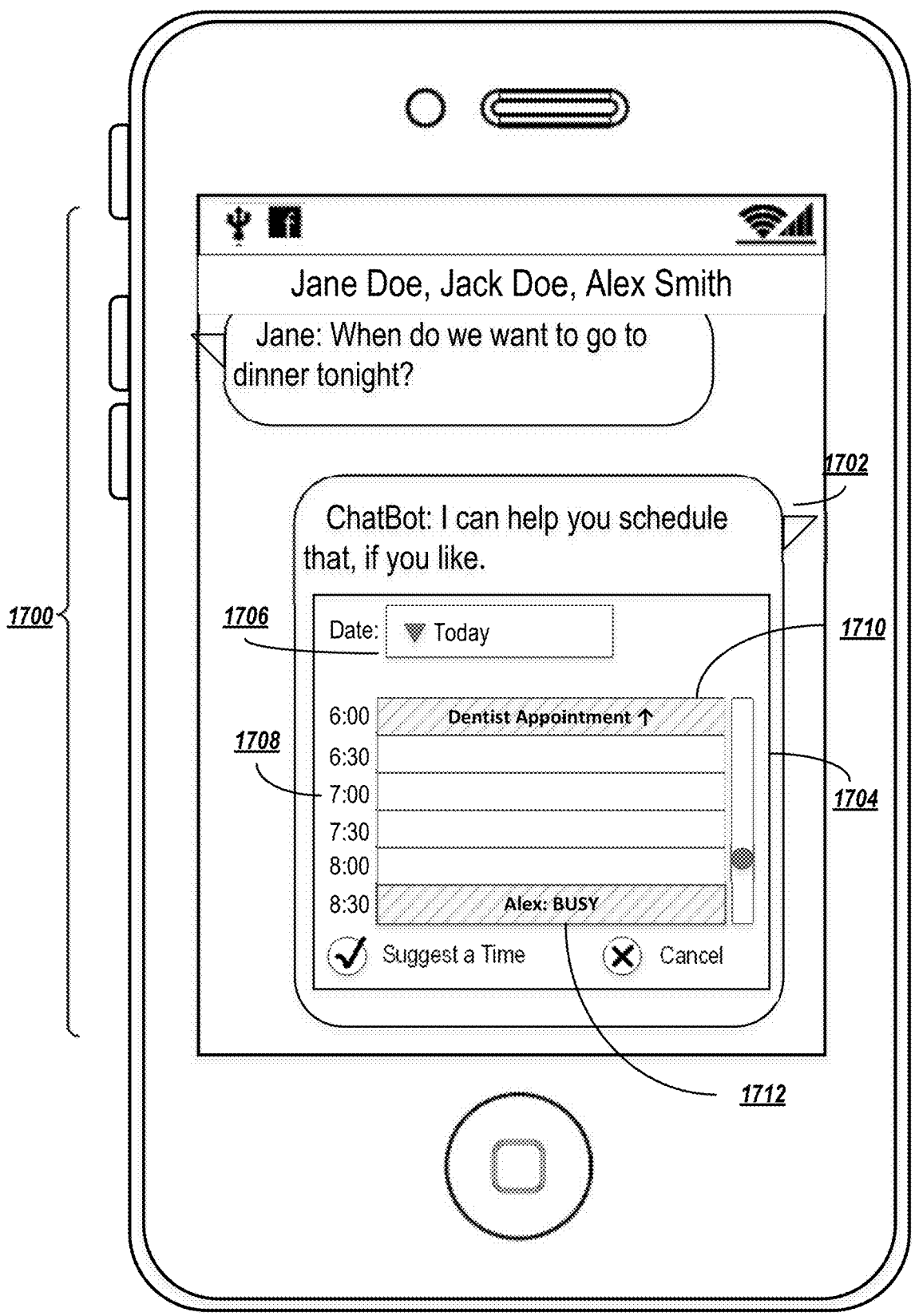
FIG. 17A depicts an example of a scheduling mini-app presented in a messaging interface.

FIG. 17A depicts another example of a feature that can be provided via the suggestion capabilities of the messaging service. In this example, an interface 1700 is used to present a scheduling mini-app 1704 provided by a scheduling bot. The suggestion interface may be configured to suggest or automatically invoke the scheduling bot in response to a determination that the participants in the conversation have exchanged messages associated with a scheduling or coordination intent.

In this example, the scheduling bot instructs the messaging service to transmit a message 1702 including a scheduling mini-app 1704. The scheduling mini-app 1704 may be used to select a date and time (or time range) during which all participants in the conversation are available. In the event that no suitable time exists, the scheduling mini-app 1704 may attempt to find the time at which the most participants are available.

The scheduling mini-app 1704 may include a selectable element 1706, such as a drop-down menu, that allows the date to be selected or changed. A scheduling interface 1708 may be displayed that shows the availability of the conversation participants on the selected date. The scheduling interface 1708 may be populated with events that the conversation participants are engaged with, such as events from a calendar from the participants' devices, events from other calendars (such as a calendar associated with the participant in a social networking service), information that is manually entered by participants into the mini-app 1704, etc. For example, the suggested time frame is populated with two events 1710, 1712 during which some conversation participants are busy. Two or more events may overlap with each other if different conversation participants are busy at the same time. In some embodiments, when multiple events overlap, a simplified event description may be provided showing how many conversation participants are busy at a given time.

Depending on respective users' privacy settings, the scheduling interface 1708 may display a description of the event that the user is participating in. For instance, the first event 1710 indicates that the local user Jane has a dentist appointment. The event description can be displayed because Jane has full access to her own calendar. On the other hand, the second event 1712 only describes Alex as "BUSY" at 8:30 PM, indicating that the local user (Jane) does not have sufficient access rights to view a description of Alex's calendar event.

Accordingly, the appearance of the mini-app 1704 (and particularly whether a description is displayed or not, and/or how descriptive that description is) may vary between the different participants in the conversation.

In some embodiments, an initial date and time range may be presented in the mini-app 1704. These initial times and dates may be selected by the scheduling bot based on processing the messages of the conversation with a natural language processor. For instance, in this example, the message that triggered the suggestion of the scheduling bot asked "when do we want to go to dinner tonight?" Based on this question, an initial date (tonight) and an initial time-range (dinner time) may be highlighted in the mini-app 1704. These initial selections may be changed, such as by selecting a new date in the selectable element 1706 and/or scrolling the displayed times on that date by scrolling in the scheduling interface 1708.

Figure 17B:
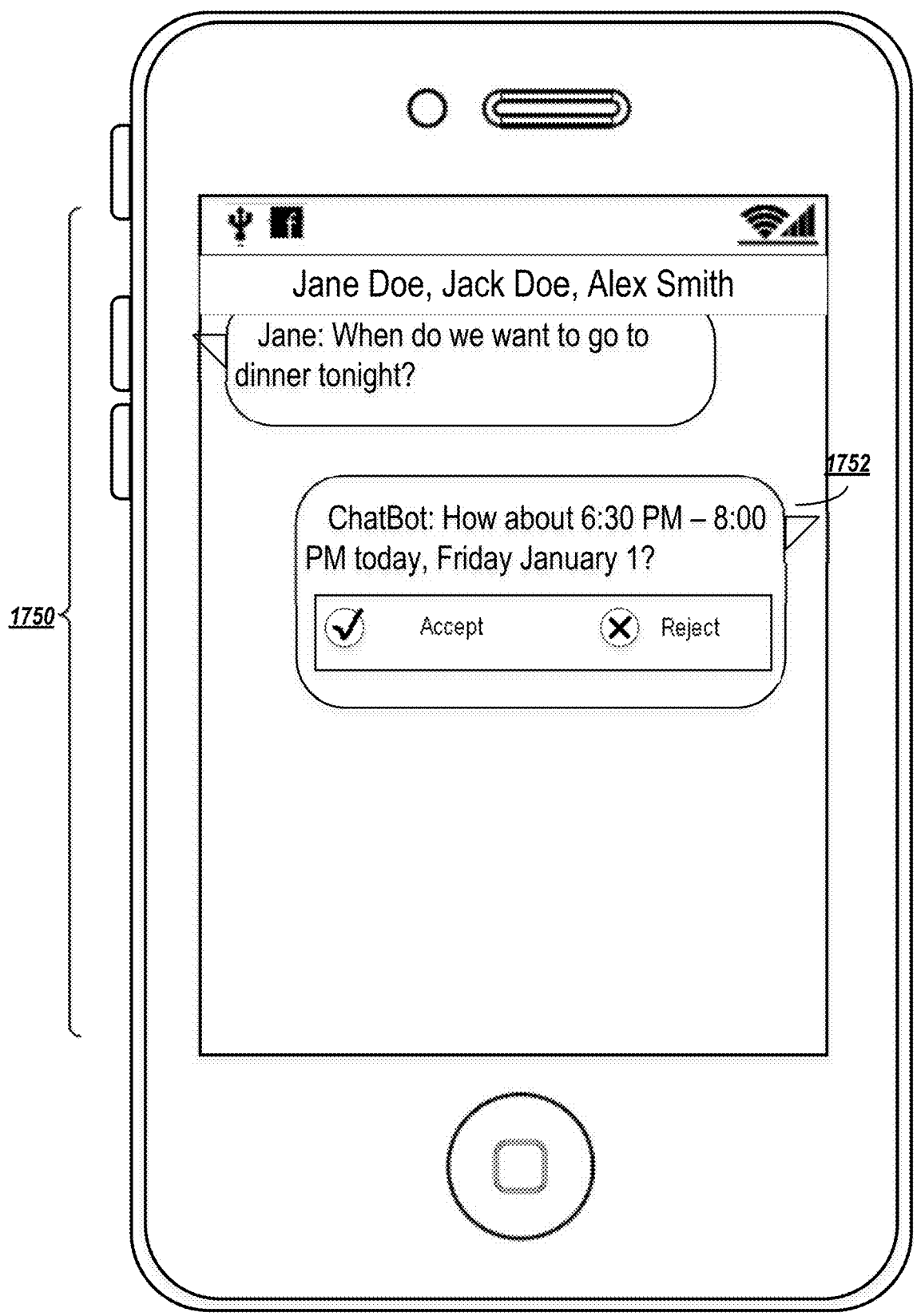
FIG. 17B depicts an example of an event scheduler added to the conversation based on the scheduling mini-app.

The user can use the scheduling interface 1708 to select a time or time range during which most of (or all of) the conversation participants are available. For example, the user can tap on a time slot to select the time slot (e.g., "let's meet at 6:30!"), or can select a starting time and drag to an ending time in order to select a time range, as shown in the example interface 1750 including a scheduling bot message 1752 as shown in FIG. 17B.

Figure 18:
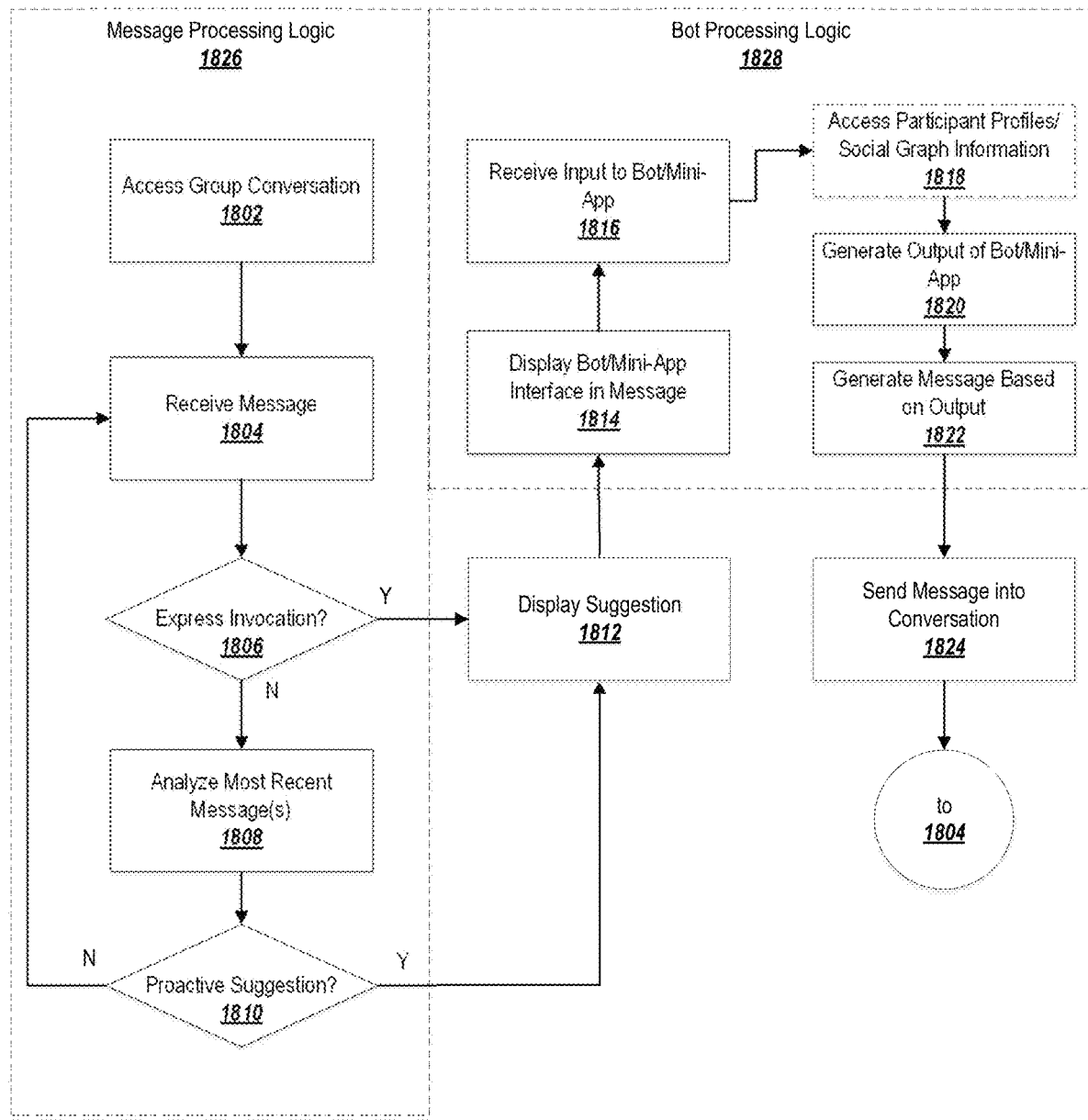
FIG. 18 is a flowchart depicting an exemplary logic flow for suggesting a bot capability according to an exemplary embodiment.

Although the suggestion capabilities have been described with respect to particular examples (polling bots, sticker bots, and scheduling bots), it is understood that the techniques described herein may be used with any suitable functionality for which suggestions can be made. To that end, FIG. 18 is a flowchart describing a general procedure for implementing suggestions logic 1800 that may be implemented on any suitable device. For example, the suggestions logic 1800 may be implemented partially or entirely on an end-user client device, a messaging server, a bot server, a third-party device, or elsewhere as appropriate.

At block 1802, the system may access a group conversation. For example, the group conversation may be a conversation through a messaging service, in which particular threads (identified, e.g., by thread identifiers) are associated with specific groups of participants. The group conversation may include two or more users.

At block 1804, the system may receive a message for the group conversation accessed at block 1802. Block 1804 may be performed, for example, by the message queue monitoring component 540 or by the client messaging component 526 depicted in FIG. 5.

At block 1806, the system may parse the message received in block 1804 and may determine if the message includes an express invocation of a suggestions feature of the system. The invocation is not necessarily an invocation of a particular bot (although a particular bot, such as a general-purpose bot of the message service, may be referenced in the invocation). Rather, the invocation may be an invocation of the suggestions capabilities of the messaging service.

An invocation may take the form of a particular command, special character, or instruction that is predefined to cause the system to invoke suggestion capabilities. The invocation may include natural language. The invocation may differ from the command required to invoke a particular bot, and hence a user need only learn a single invocation in order to trigger the suggestion capabilities (and, through them, to trigger multiple different types of bots, without necessarily needing to remember the invocation commands for each bot).

The invocation may include natural language corresponding to an intent recognized by the system (see block 1810 below). For example, if the system is configured to recognize an intent of starting a poll, the invocation may include natural language such as "create a survey" or "poll the group."

If the determination at block 1806 is "yes" (i.e., the message includes an express invocation of the suggestions capabilities of the system), then processing may proceed to block 1812. Otherwise, processing proceeds to block 1808.

At block 1808, the system may analyze one or more of the most recent messages in the conversation. In some embodiments, only the current message is analyzed. In others, the n most recent messages may be analyzed. The value of n may be predetermined (e.g., based on an estimated number of messages that will give a reasonable evaluation of whether the conversation participants wish to invoke the suggestions features) and or may dynamically vary. For example, the value of n may depend on the resources available to the system processing the messages—if only a limited amount of battery, memory, and/or processing capabilities are available, then the value of n may be reduced.

The value of n may be adjusted based on user preferences. In some embodiments, if the system is offering a bot suggestions that the conversation participants are not accepting (i.e., the participants' rate of acceptance of the suggestions is below a predetermined threshold), then the system may determine that it is not calibrated to properly determine whether users are, in fact, invoking suggestions. The value of n may be reduced accordingly.

The n messages may be provided to a natural language processor (such as the natural language processing component 560 of FIG. 5). The natural language processor may evaluate the natural language in the messages to determine an intent of the conversation participants (similar to the user intent 515 of FIG. 5).

In generating the intent, the system may analyze the natural language in view of predetermined intents that the system is configured to evaluate. The predetermined intents may be intents corresponding to capabilities of bots available to the system (e.g., as reflected in the bot capability table 710), such as bots reflected in a bot capability catalog 770. One intent may map to multiple bots (e.g., multiple different bots may provide the same or similar capabilities). Each of these bots may be considered a candidate bot for fulfilling the intent.

For each of the predetermined intents, the system may calculate a confidence score indicating (e.g.) a probability that the natural language corresponds to the intent. If at least one of the confidence scores exceeds a predetermined threshold value, the system may determine that the participants are attempting to use the bot capability corresponding to the intent.

The express invocation and/or the natural language indicating an intent that is used to offer a proactive suggestion may be considered a user service prompt (see, e.g., the description of the user service prompt in connection with the client communication component 740 above.

If the determination at block 1810 is "no" (meaning that the message(s) did not include an express invocation or an intent to trigger a proactive suggestion), then processing may return to block 1804 and the system may await the next message in the conversation. If the determination at either block 1806 or block 1810 is "yes," then processing may proceed to block 1812 and a suggestion may be displayed.

In some embodiments, the suggestion may be a suggestion to invoke a particular bot; in others, multiple bots may be suggested (e.g., as shown in the messaging bot invocation control 315 in FIG. 3). The decision as to whether to suggest a single bot or multiple may be made based on the number of available bots that are capable of servicing the intent (e.g., if only one such bot exists, then that bot may be suggested by itself). It may also or alternatively be made based on user preferences (e.g., if a user has a preferred bot for servicing a particular intent), a user's bot invocation history (e.g., the user predominantly invokes a particular bot to fulfill a particular intent), or other factors.

If multiple bots are available for suggestion, the system may select a predetermined number n of bots to be suggested. The number n may be selected based on the available real estate on the messaging application's interface (e.g., so as to accommodate the most number of icons that will fit into the available space). The system may select n bots from a bot catalog by ranking the bots based on a relevancy score. The relevancy score may be based on user preferences, how well the bot can fulfil the intent based on the conversation context, a user's bot invocation history, of other factors. The bots may be ranked based on the relevancy scores, and the top n bots in the rankings may be selected for display in a suggestions interface.

The suggestion may be displayed in the conversation (e.g., in a message in the conversation). In some embodiments, an interface element (such as a bot suggestion interface bar) may be added to the conversation interface.

The suggestion may be displayed to all conversation participants, to a subset of conversation participants, or to a selected participant (e.g., the participant whose message included an express invocation, or one or more participants whose messages triggered a proactive suggestion).

A user may select a bot from the suggestions in order to invoke the bot. If a single bot was suggested, the suggestion may include an interactable element allowing a user to confirm or reject invocation of the bot. In response to a user selecting the bot, the messaging system may invoke the bot, which may cause the bot to open a mini-app interface in the message (block 1814).

The mini-app interface may be unique to a given bot. The mini-app interface may be displayed within a message in the conversation (e.g., a message from the bot), or separately in the conversation interface. The mini-app may include interactable elements allowing the user to configure the bot. For example, the mini-app may allow the user to select options for a poll, select a graphical element to be added to the conversation, or display availability times in a calendar.

At block 1816, one or more conversation participants may use the interactable elements in the mini-app to provide inputs to the bot. In some embodiments, inputs to the bot may be received via the conversation (e.g., a user may send a new message, possibly directed to the bot using special characters, such as @<bot name>).

In some embodiments, the bot may be provide with inputs by the natural language processor based on messages that were previously exchanged in the conversation. For example, if the users have previously mentioned poll options, times, emotions, etc., these concepts may be applied to the bot as inputs. In some embodiments, the bot receives inputs from multiple participants in the conversation.

At block 1818, the bot may optionally access additional information pertaining to the participants. For instance, the system may access information from the users' profiles with the messaging service, information in a user's social networking graph, a user's calendars, etc. This information may be used to further configure the bot.

At block 1820, the system may query the bot using the information from the user service prompt, information gathered at blocks 1816 and 1818, and any other information made available to the bot. At block 1822, the bot may use this information to generate a suitable output (such as a poll, a suggested appointment time or range, etc.). The bot may use the output to construct a message and send the message into the conversation (block 1824). Alternatively or in addition, the bot may update the mini-app based on the output generated at block 1822.

Processing may then return to block 1804, and the system may await a new message in the conversation.

It is noted that, in some embodiments, processing may proceed directly from block 18060 or 1812 to block 1824 (skipping the suggestions and/or the bot processing logic). For example, if a suggestion at block 1812 involves presenting stickers to a user that can be shared into a conversation, the selected sticker may be shared directly into the conversation without necessarily invoking a separate bot. Some embodiments may open a mini-app, whereas some may share directly into the conversation.

The various logic blocks described above may be implemented by various pieces of logic; for example, in the example depicted above, blocks 1802-1810 may be implemented by message processing logic 1826, whereas blocks 1814-1822 may be implemented by bot processing logic 1828. The division of the logical blocks among various logics as described may facilitate reuse of the implementing computer code, and/or division of the code among various devices and/or applications. However, the manner in which the logical blocks are broken up in FIG. 18 is not the only possible implementation, and other divisions are possible. Moreover, additional logical blocks may be provided, logical blocks may be removed, and/or the depicted logical blocks may be implemented in a different order.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled,"

however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
   receiving, in a messaging conversation between a plurality of participants, a user service prompt comprising natural language;
   identifying that a bot capability exists pertaining to the user service prompt;
   displaying a suggestion pertaining to the bot capability in the messaging conversation;
   receiving an invocation of a bot configured to respond to the user service prompt by providing the bot capability;
   querying the bot based on the user service prompt, wherein querying the bot comprises adding the bot to the messaging conversation as a participant and providing input to the bot from two or more of the participants in the messaging conversation; and
   providing a response of the bot in the messaging conversation.

2. The method of claim 1, wherein the user service prompt comprises an explicit invocation of a capability provided by the bot.

3. The method of claim 1, wherein identifying that the bot capability exists comprises:
   analyzing one or more messages of the conversation using a natural language processor;
   identifying an intent in the one or more messages; and
   determining that one or more candidate bots exists corresponding to the identified intent, wherein the selected bot is selected from among the candidate bots.

4. The method of claim 3, wherein the one or more candidate bots are retrieved, based on a relevancy score, from a bot catalog maintained by a messaging service managing the conversation.

5. The method of claim 1, wherein the suggestion is displayed in an interactable mini-app inside of the conversation.

6. The method of claim 1, wherein the bot is configured to start a poll among the participants of the conversation, suggest a graphical element to be added to the conversation, or provide a group coordination or planning capability.

7. A non-transitory computer-readable medium storing instructions configured to cause a processor to:
   receiving, in a messaging conversation between a plurality of participants, a user service prompt comprising natural language;
   identifying that a bot capability exists pertaining to the user service prompt; displaying a suggestion pertaining to the bot capability in the messaging conversation;
   receiving an invocation of a bot configured to respond to the user service prompt by providing the bot capability;
   querying the bot based on the user service prompt, wherein querying the bot comprises adding the bot to the messaging conversation as a participant and providing input to the bot from two or more of the participants in the messaging conversation; and
   providing a response of the bot in the messaging conversation.

8. The medium of claim 7, wherein the user service prompt comprises an explicit invocation of a capability provided by the bot.

9. The medium of claim 7, wherein identifying that the bot capability exists comprises:
   analyzing one or more messages of the conversation using a natural language processor;
   identifying an intent in the one or more messages; and
   determining that one or more candidate bots exists corresponding to the identified intent, wherein the selected bot is selected from among the candidate bots.

10. The medium of claim 9, wherein the one or more candidate bots are retrieved, based on a relevancy score, from a bot catalog maintained by a messaging service managing the conversation.

11. The medium of claim 7, wherein the suggestion is displayed in an interactable mini-app inside of the conversation.

12. The medium of claim 7, wherein the bot is configured to start a poll among the participants of the conversation, suggest a graphical element to be added to the conversation, or provide a group coordination or planning capability.

13. An apparatus comprising:
   a network interface configured to receive, in a messaging conversation between a plurality of participants, a user service prompt comprising natural language; and
   a processor circuit configured to:
      identify that a bot capability exists pertaining to the user service prompt;
      cause a suggestion pertaining to the bot capability to be displayed in the messaging conversation;

receive an invocation of a bot configured to respond to the user service prompt by providing the bot capability;

query the bot based on the user service prompt, wherein querying the bot comprises adding the bot to the messaging conversation as a participant and providing input to the bot from two or more of the participants in the messaging conversation; and provide a response of the bot in the messaging conversation.

14. The apparatus of claim 13, wherein the user service prompt comprises an explicit invocation of a capability provided by the bot.

15. The apparatus of claim 13, wherein identifying that the bot capability exists comprises:

analyzing one or more messages of the conversation using a natural language processor;

identifying an intent in the one or more messages; and determining that one or more candidate bots exists corresponding to the identified intent, wherein the selected bot is selected from among the candidate bots.

16. The apparatus of claim 13, wherein the suggestion is displayed in an interactable mini-app inside of the conversation.

17. The apparatus of claim 13, wherein the bot is configured to start a poll among the participants of the conversation, suggest a graphical element to be added to the conversation, or provide a group coordination or planning capability.

* * * * *